US008366538B1

(12) United States Patent
Saunders et al.

(10) Patent No.: US 8,366,538 B1
(45) Date of Patent: Feb. 5, 2013

(54) GAMING SYSTEM, GAMING DEVICE AND METHOD FOR PROVIDING A MULTIPLE DIMENSION CASCADING SYMBOLS GAME

(75) Inventors: Brian F. Saunders, Sunnyvale, CA (US); Scott A. Caputo, Santa Clara, CA (US)

(73) Assignee: IGT, Reno, NV (US)

( * ) Notice: Subject to any disclaimer, the term of this patent is extended or adjusted under 35 U.S.C. 154(b) by 39 days.

(21) Appl. No.: 13/187,648

(22) Filed: Jul. 21, 2011

(51) Int. Cl.
*A63F 9/24* (2006.01)
*A63F 13/00* (2006.01)

(52) U.S. Cl. ................ 463/20; 463/11; 463/18; 463/31; 463/32

(58) Field of Classification Search .................... 463/11, 463/20
See application file for complete search history.

(56) References Cited

U.S. PATENT DOCUMENTS

| | | | |
|---|---|---|---|
| 1,978,395 | A | 10/1934 | Groetchen |
| 3,420,525 | A | 1/1969 | Waders |
| 3,642,287 | A | 2/1972 | Lally et al. |
| 3,735,987 | A | 5/1973 | Ohki |
| 4,099,722 | A | 7/1978 | Rodesch et al. |
| 4,198,052 | A | 4/1980 | Gauselmann |
| 4,200,291 | A | 4/1980 | Hooker |
| 4,326,351 | A | 4/1982 | Heywood et al. |
| 4,357,567 | A | 11/1982 | Rock |
| 4,636,951 | A | 1/1987 | Harlick |
| 4,695,053 | A | 9/1987 | Vazquez, Jr. et al. |
| 4,711,451 | A | 12/1987 | Pajak et al. |
| 4,722,527 | A | 2/1988 | Gauselmann |
| 4,790,537 | A | 12/1988 | Smyth et al. |
| 4,826,169 | A | 5/1989 | Bessho et al. |
| 4,874,173 | A | 10/1989 | Kishishita |
| 5,092,598 | A | 3/1992 | Kamille |
| 5,152,529 | A | 10/1992 | Okada |
| 5,205,555 | A | 4/1993 | Hamano |
| RE34,244 | E | 5/1993 | Hagiwara |
| 5,224,706 | A | 7/1993 | Bridgeman et al. |
| 5,308,062 | A | 5/1994 | Hogan |
| 5,308,065 | A | 5/1994 | Bridgeman et al. |
| 5,332,219 | A | 7/1994 | Marnell, II et al. |
| 5,332,228 | A | 7/1994 | Schultz |
| 5,364,100 | A | 11/1994 | Ludlow et al. |
| 5,393,057 | A | 2/1995 | Marnell, II |

(Continued)

FOREIGN PATENT DOCUMENTS

| | | |
|---|---|---|
| AU | 198774936 | 6/1987 |
| AU | 710015 | 9/1997 |

(Continued)

*Primary Examiner* — Steven J Hylinski
(74) *Attorney, Agent, or Firm* — Neal, Gerber & Eisenberg LLP

(57) ABSTRACT

A gaming system including a cascading symbol game which utilizes a plurality of adjacent symbol display position grids arranged at different depths. The multiple symbol display position grids at different depths provides that one or more of the symbols of at least a first symbol display position grid at a first depth are displayed to a player while one or more of the symbols of at least a second symbol display position grid at a second depth are not displayed to the player. When one or more symbols are removed from the first symbol display position grid at the first depth, before and/or after shifting the remaining displayed symbols from the first symbol display position grid into created empty symbol display positions of the first symbol display position grid, one or more symbols from the second symbol display position grid at the second depth become exposed.

20 Claims, 21 Drawing Sheets

U.S. PATENT DOCUMENTS

| | | | | |
|---|---|---|---|---|
| 5,395,111 | A | 3/1995 | Inoue | |
| 5,423,539 | A | 6/1995 | Nagao | |
| 5,431,408 | A | 7/1995 | Adams | |
| 5,449,173 | A | 9/1995 | Thomas et al. | |
| 5,531,440 | A | 7/1996 | Dabrowski et al. | |
| 5,564,700 | A | 10/1996 | Celona | |
| 5,584,764 | A | 12/1996 | Inoue | |
| 5,609,524 | A | 3/1997 | Inoue | |
| 5,624,119 | A | 4/1997 | Leake | |
| 5,664,998 | A | 9/1997 | Seelig et al. | |
| 5,704,835 | A | 1/1998 | Dietz | |
| 5,720,662 | A | 2/1998 | Holmes et al. | |
| 5,722,891 | A | 3/1998 | Inoue | |
| 5,752,881 | A | 5/1998 | Inoue | |
| 5,769,716 | A | 6/1998 | Saffari et al. | |
| 5,772,506 | A | 6/1998 | Marks et al. | |
| 5,807,172 | A | 9/1998 | Piechowiak | |
| 5,813,911 | A | 9/1998 | Margolin | |
| 5,823,873 | A | 10/1998 | Moody | |
| 5,833,536 | A | 11/1998 | Davids et al. | |
| 5,833,537 | A | 11/1998 | Barrie | |
| 5,863,249 | A | 1/1999 | Inoue | |
| 5,882,260 | A | 3/1999 | Marks et al. | |
| 5,951,397 | A | 9/1999 | Dickinson | |
| 5,980,384 | A | 11/1999 | Barrie | |
| 5,984,782 | A | 11/1999 | Inoue | |
| 5,997,400 | A | 12/1999 | Seelig et al. | |
| 5,997,401 | A | 12/1999 | Crawford | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mangano et al. | |
| 6,062,978 | A * | 5/2000 | Martino et al. | 463/9 |
| 6,086,066 | A | 7/2000 | Takeuchi et al. | |
| 6,089,976 | A | 7/2000 | Schneider et al. | |
| 6,089,977 | A | 7/2000 | Bennett | |
| 6,093,102 | A | 7/2000 | Bennett | |
| 6,095,921 | A | 8/2000 | Walker et al. | |
| 6,117,013 | A | 9/2000 | Eiba | |
| 6,120,031 | A | 9/2000 | Adams | |
| 6,120,376 | A | 9/2000 | Bennett | |
| 6,120,377 | A | 9/2000 | McGinnis et al. | |
| 6,139,124 | A | 10/2000 | Baerlocher et al. | |
| 6,142,872 | A | 11/2000 | Walker et al. | |
| 6,142,875 | A | 11/2000 | Kodachi et al. | |
| 6,149,521 | A | 11/2000 | Sanduski | |
| 6,159,095 | A | 12/2000 | Frohm et al. | |
| 6,159,096 | A | 12/2000 | Yoseloff | |
| 6,159,098 | A | 12/2000 | Slomiany et al. | |
| 6,174,235 | B1 | 1/2001 | Walker et al. | |
| 6,190,254 | B1 | 2/2001 | Bennett | |
| 6,203,009 | B1 | 3/2001 | Sines et al. | |
| 6,220,959 | B1 | 4/2001 | Holmes, Jr. et al. | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,254,481 | B1 | 7/2001 | Jaffe | |
| 6,261,177 | B1 | 7/2001 | Bennett | |
| 6,270,411 | B1 | 8/2001 | Gura et al. | |
| 6,270,412 | B1 | 8/2001 | Crawford et al. | |
| 6,290,600 | B1 | 9/2001 | Glasson | |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,302,429 | B1 | 10/2001 | Friedrich | |
| 6,305,686 | B1 | 10/2001 | Perrie et al. | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,315,663 | B1 | 11/2001 | Sakamoto | |
| 6,318,721 | B1 | 11/2001 | Randall et al. | |
| 6,319,124 | B1 | 11/2001 | Baerlocher et al. | |
| 6,322,078 | B1 | 11/2001 | Adams | |
| 6,332,838 | B1 * | 12/2001 | Yamagami | 463/9 |
| 6,334,814 | B1 | 1/2002 | Adams | |
| 6,336,860 | B1 | 1/2002 | Webb | |
| 6,346,043 | B1 | 2/2002 | Colin et al. | |
| 6,347,996 | B1 | 2/2002 | Gilmore et al. | |
| 6,358,144 | B1 | 3/2002 | Kaddlic et al. | |
| 6,394,902 | B1 | 5/2002 | Glavich et al. | |
| 6,398,644 | B1 | 6/2002 | Perrie et al. | |
| 6,409,602 | B1 | 6/2002 | Wilshire et al. | |
| 6,413,161 | B1 | 7/2002 | Baerlocher et al. | |
| 6,413,162 | B1 | 7/2002 | Baerlocher et al. | |
| 6,416,408 | B2 | 7/2002 | Tracy et al. | |
| 6,419,579 | B1 | 7/2002 | Bennett | |
| 6,428,412 | B1 | 8/2002 | Anderson et al. | |
| 6,439,993 | B1 | 8/2002 | O'Halloran | |
| 6,454,266 | B1 | 9/2002 | Breeding et al. | |
| 6,458,032 | B1 * | 10/2002 | Yamagami | 463/9 |
| 6,464,581 | B1 | 10/2002 | Yoseloff et al. | |
| 6,481,713 | B2 | 11/2002 | Perrie et al. | |
| 6,494,454 | B2 | 12/2002 | Adams | |
| 6,517,432 | B1 | 2/2003 | Jaffe | |
| 6,517,433 | B2 | 2/2003 | Loose et al. | |
| 6,554,703 | B1 | 4/2003 | Bussick et al. | |
| 6,554,704 | B2 | 4/2003 | Nicastro et al. | |
| 6,561,904 | B2 | 5/2003 | Locke et al. | |
| 6,565,433 | B1 | 5/2003 | Baerlocher et al. | |
| 6,575,830 | B2 | 6/2003 | Baerlocher et al. | |
| 6,585,591 | B1 | 7/2003 | Baerlocher et al. | |
| 6,589,114 | B2 | 7/2003 | Rose | |
| 6,604,740 | B1 | 8/2003 | Singer et al. | |
| 6,616,142 | B2 | 9/2003 | Adams | |
| 6,632,139 | B1 | 10/2003 | Baerlocher | |
| 6,632,140 | B2 | 10/2003 | Berman et al. | |
| 6,634,945 | B2 | 10/2003 | Glavich et al. | |
| 6,641,477 | B1 | 11/2003 | Dietz | |
| 6,643,943 | B2 | 11/2003 | Dall'Aglio et al. | |
| 6,644,663 | B2 | 11/2003 | Seelig et al. | |
| 6,644,664 | B2 * | 11/2003 | Muir et al. | 273/146 |
| 6,645,070 | B2 * | 11/2003 | Lupo | 463/9 |
| 6,659,864 | B2 | 12/2003 | McGahn et al. | |
| 6,666,767 | B1 | 12/2003 | Dayan | |
| 6,676,511 | B2 | 1/2004 | Payne et al. | |
| 6,676,512 | B2 | 1/2004 | Fong et al. | |
| 6,695,696 | B1 | 2/2004 | Kaminkow | |
| 6,702,671 | B2 | 3/2004 | Tarantino | |
| 6,712,693 | B1 | 3/2004 | Hettinger | |
| 6,715,756 | B2 | 4/2004 | Inoue | |
| 6,719,630 | B1 | 4/2004 | Seelig et al. | |
| 6,733,386 | B2 | 5/2004 | Cuddy et al. | |
| 6,746,328 | B2 | 6/2004 | Cannon et al. | |
| 6,746,329 | B1 * | 6/2004 | Duhamel | 463/20 |
| 6,749,502 | B2 | 6/2004 | Baerlocher | |
| 6,780,109 | B2 | 8/2004 | Kaminkow | |
| 6,786,818 | B1 | 9/2004 | Rothschild et al. | |
| 6,802,775 | B2 | 10/2004 | Baerlocher et al. | |
| 6,805,349 | B2 | 10/2004 | Baerlocher et al. | |
| 6,805,632 | B2 | 10/2004 | Suda | |
| 6,808,454 | B2 | 10/2004 | Gerrard et al. | |
| 6,832,957 | B2 | 12/2004 | Falconer | |
| 6,837,788 | B2 | 1/2005 | Cannon | |
| 6,855,054 | B2 | 2/2005 | White et al. | |
| 6,866,583 | B2 | 3/2005 | Glavich et al. | |
| 6,875,106 | B2 | 4/2005 | Weiss et al. | |
| 6,878,061 | B2 | 4/2005 | Baerlocher et al. | |
| 6,887,157 | B2 | 5/2005 | LeMay et al. | |
| 6,896,617 | B2 | 5/2005 | Daly | |
| 6,905,406 | B2 | 6/2005 | Kaminkow et al. | |
| 6,908,381 | B2 * | 6/2005 | Ellis | 463/13 |
| 6,910,962 | B2 | 6/2005 | Marks et al. | |
| 6,913,533 | B2 | 7/2005 | Cuddy et al. | |
| 6,921,335 | B2 | 7/2005 | Rodgers et al. | |
| 6,929,952 | B2 | 8/2005 | Baerlocher | |
| 6,935,950 | B2 | 8/2005 | Tarantino | |
| 6,939,229 | B2 | 9/2005 | McClintic | |
| 6,942,571 | B1 | 9/2005 | McAllister et al. | |
| 6,960,133 | B1 | 11/2005 | Marks et al. | |
| 6,960,134 | B2 | 11/2005 | Hard et al. | |
| 6,964,416 | B2 | 11/2005 | McClintic et al. | |
| 6,971,955 | B2 | 12/2005 | Baerlocher et al. | |
| 6,979,263 | B2 | 12/2005 | Baerlocher et al. | |
| 6,981,635 | B1 | 1/2006 | Hughs-Baird et al. | |
| 6,986,710 | B2 | 1/2006 | Baerlocher et al. | |
| 6,991,538 | B2 | 1/2006 | Cannon | |

6,997,804 B2 2/2006 Berman
7,001,274 B2 2/2006 Baerlocher et al.
7,014,560 B2 3/2006 Glavich et al.
7,022,016 B2 4/2006 Wood et al.
7,040,983 B2 5/2006 Dolloff et al.
7,048,275 B2 5/2006 Adams
7,052,395 B2 5/2006 Glavich et al.
7,056,209 B2 6/2006 Baerlocher et al.
7,056,213 B2 6/2006 Ching et al.
7,059,967 B2 6/2006 Baerlocher
7,070,502 B1 7/2006 Bussick et al.
7,074,127 B2 7/2006 Cuddy et al.
7,077,745 B2 7/2006 Gomez et al.
7,090,580 B2 8/2006 Rodgers et al.
7,094,148 B2 8/2006 Baerlocher et al.
7,104,886 B2 9/2006 Baerlocher et al.
7,108,602 B2 9/2006 Daly
7,128,646 B2 10/2006 Baerlocher et al.
7,137,888 B2 11/2006 Glavich et al.
7,144,322 B2 12/2006 Gomez et al.
7,153,205 B2 12/2006 Baerlocher
7,160,186 B2 1/2007 Cuddy et al.
7,169,042 B2 1/2007 Muir et al.
7,192,345 B2 * 3/2007 Muir et al. ...................... 463/20
7,195,559 B2 3/2007 Gilmore et al.
7,222,858 B2 5/2007 Moody
7,226,359 B2 6/2007 Bussick et al.
7,236,113 B1 6/2007 Wang
7,252,591 B2 8/2007 Van Asdale
7,252,592 B2 8/2007 Rodgers et al.
7,294,055 B2 11/2007 Baerlocher et al.
7,294,058 B1 11/2007 Slomiany et al.
7,309,281 B2 12/2007 Baerlocher et al.
7,309,282 B2 12/2007 Baerlocher et al.
7,331,862 B2 2/2008 Rodgers et al.
7,331,866 B2 2/2008 Rodgers et al.
7,341,512 B2 3/2008 Dolloff et al.
7,357,713 B2 4/2008 Marks et al.
7,371,169 B2 5/2008 Baerlocher
7,371,170 B2 5/2008 Cregan et al.
7,371,172 B2 5/2008 Inoue
7,396,279 B2 7/2008 Berman et al.
7,399,225 B2 7/2008 Kaminkow
7,399,226 B2 7/2008 Mishra
7,402,102 B2 7/2008 Marks et al.
7,442,123 B2 10/2008 Brill et al.
7,448,948 B2 11/2008 Hughs-Baird et al.
7,473,173 B2 1/2009 Peterson et al.
7,494,412 B2 2/2009 Baerlocher
7,510,473 B2 3/2009 Thomas
7,553,231 B2 6/2009 Rodgers et al.
7,604,539 B2 * 10/2009 Hartl et al. ...................... 463/20
7,611,406 B2 11/2009 Fuller
7,666,085 B2 2/2010 Vorias et al.
7,690,983 B2 * 4/2010 Hartl et al. ...................... 463/20
7,749,082 B2 * 7/2010 Dunaevsky et al. ............ 463/32
7,785,179 B2 * 8/2010 Ionescu ............................ 463/9
2001/0016513 A1 8/2001 Muir et al.
2002/0010017 A1 1/2002 Bennett
2002/0025849 A1 2/2002 Olive
2002/0068623 A1 6/2002 Gauselmann
2002/0077165 A1 6/2002 Bansemer et al.
2003/0045345 A1 3/2003 Berman
2003/0045354 A1 3/2003 Giobbi
2003/0054874 A1 3/2003 Kaminkow
2003/0057645 A1 3/2003 Baerlocher et al.
2003/0060267 A1 3/2003 Glavich et al.
2003/0064768 A1 4/2003 Fier
2003/0100356 A1 5/2003 Brown et al.
2003/0157981 A1 8/2003 Marks et al.
2003/0190945 A1 10/2003 Bussick et al.
2003/0203753 A1 10/2003 Muir et al.
2003/0207710 A1 11/2003 Rodgers et al.
2004/0012145 A1 1/2004 Inoue
2004/0014516 A1 1/2004 Inoue
2004/0014517 A1 1/2004 Inoue
2004/0018866 A1 1/2004 Inoue
2004/0023714 A1 * 2/2004 Asdale ............................ 463/22
2004/0026854 A1 2/2004 Inoue
2004/0033827 A1 2/2004 Gilmore et al.
2004/0033829 A1 2/2004 Pacey et al.
2004/0036218 A1 2/2004 Inoue
2004/0038726 A1 2/2004 Inoue
2004/0043809 A1 3/2004 Gomez et al.
2004/0048651 A1 3/2004 Vorias et al.
2004/0053669 A1 3/2004 Gerrard et al.
2004/0053672 A1 3/2004 Baerlocher
2004/0053676 A1 3/2004 Rodgers
2004/0067790 A1 4/2004 Peterson et al.
2004/0072612 A1 4/2004 Rodgers et al.
2004/0097280 A1 5/2004 Gauselmann
2004/0102236 A1 5/2004 Suda et al.
2004/0102244 A1 5/2004 Kryuchkov et al.
2004/0102245 A1 5/2004 Escalera et al.
2004/0137982 A1 7/2004 Cuddy et al.
2004/0147306 A1 7/2004 Randall et al.
2005/0020344 A1 1/2005 Kaminkow
2005/0049035 A1 3/2005 Baerlocher et al.
2005/0054429 A1 3/2005 Baerlocher et al.
2005/0059446 A1 3/2005 Kaminkow
2005/0064924 A1 3/2005 Glavich et al.
2005/0070354 A1 3/2005 Baerlocher et al.
2005/0101380 A1 5/2005 Glavich et al.
2005/0119403 A1 6/2005 St. Clair
2005/0148381 A1 7/2005 Marks et al.
2005/0148384 A1 7/2005 Marks et al.
2005/0197180 A1 9/2005 Kaminkow et al.
2005/0227754 A1 10/2005 Kaminkow et al.
2005/0245307 A1 11/2005 Gatto et al.
2005/0282620 A1 12/2005 Marks et al.
2005/0288094 A1 12/2005 Marks et al.
2006/0030392 A1 2/2006 Rodgers et al.
2006/0046830 A1 3/2006 Webb
2006/0058097 A1 3/2006 Berman et al.
2006/0068875 A1 3/2006 Cregan et al.
2006/0068882 A1 3/2006 Baerlocher et al.
2006/0068884 A1 3/2006 Baerlocher et al.
2006/0068885 A1 3/2006 Cregan et al.
2006/0073876 A1 4/2006 Cuddy
2006/0073879 A1 4/2006 Baerlocher
2006/0084492 A1 4/2006 Baerlocher et al.
2006/0084494 A1 4/2006 Belger et al.
2006/0084498 A1 4/2006 Baerlocher et al.
2006/0089191 A1 4/2006 Singer et al.
2006/0116195 A1 6/2006 Baerlocher et al.
2006/0172795 A1 8/2006 Bussick et al.
2006/0199636 A1 9/2006 Ching et al.
2006/0199637 A1 9/2006 Ching et al.
2006/0217189 A1 9/2006 Walker et al.
2006/0258423 A1 * 11/2006 Englman et al. ................ 463/11
2006/0264254 A1 11/2006 Aoki
2007/0010316 A1 1/2007 Baerlocher et al.
2007/0021176 A1 1/2007 Jackson
2007/0021188 A1 1/2007 Rodgers et al.
2007/0060246 A1 3/2007 Baerlocher et al.
2007/0060248 A1 3/2007 Rodgers et al.
2007/0060294 A1 3/2007 Cuddy et al.
2007/0087812 A1 4/2007 Glavich et al.
2007/0287523 A1 12/2007 Esses et al.
2008/0051174 A1 2/2008 Fiden
2008/0090655 A1 4/2008 Marks et al.
2008/0096670 A1 4/2008 Baerlocher et al.
2008/0102931 A1 5/2008 Marks et al.
2008/0108411 A1 5/2008 Jensen et al.
2008/0113765 A1 5/2008 DeWall
2008/0132320 A1 6/2008 Rodgers
2008/0139298 A1 6/2008 Rodgers et al.
2008/0200232 A1 8/2008 Baerlocher et al.
2008/0200238 A1 8/2008 Mishra
2008/0214282 A1 9/2008 Inoue
2008/0234032 A1 9/2008 Mullahkhel et al.
2009/0118004 A1 5/2009 Hoffman
2009/0124325 A1 5/2009 Wadleigh et al.
2009/0124347 A1 5/2009 Rodgers et al.
2010/0004050 A1 1/2010 Caputo et al.
2010/0004056 A1 1/2010 Walker et al.
2010/0022297 A1 1/2010 Saunders
2010/0029364 A1 2/2010 Zielinski

| | | | | |
|---|---|---|---|---|
| 2010/0120507 | A1 | 5/2010 | Rodgers et al. | |
| 2010/0124972 | A1 | 5/2010 | Rodgers et al. | |
| 2010/0130280 | A1 | 5/2010 | Arezina et al. | |
| 2010/0234094 | A1 | 9/2010 | Gagner et al. | |
| 2011/0053675 | A1 | 3/2011 | Aoki et al. | |
| 2011/0086695 | A1 | 4/2011 | Evans | |
| 2011/0111825 | A1 | 5/2011 | Caputo | |
| 2011/0117989 | A1 | 5/2011 | Kennedy et al. | |
| 2012/0108317 | A1* | 5/2012 | Caputo et al. | 463/20 |
| 2012/0115578 | A1* | 5/2012 | Caputo et al. | 463/21 |
| 2012/0238348 | A1* | 9/2012 | Aoki et al. | 463/21 |

FOREIGN PATENT DOCUMENTS

| | | |
|---|---|---|
| AU | 722969 | 6/1998 |
| AU | 199917318 | 9/1999 |
| AU | 200069612 | 2/2001 |
| AU | 200139027 | 10/2001 |
| AU | 2001256012 | 12/2001 |
| AU | 2001256014 | 12/2001 |
| EP | 0058488 | 8/1982 |
| EP | 0060019 | 9/1982 |
| EP | 0410789 | 1/1991 |
| EP | 0874337 | 10/1998 |
| EP | 0981119 | 2/2000 |
| EP | 0984408 | 3/2000 |
| EP | 1039424 | 9/2000 |
| EP | 1063622 | 12/2000 |
| EP | 1150261 | 10/2001 |
| EP | 1184822 | 3/2002 |
| EP | 1197932 | 4/2002 |
| EP | 1205894 | 5/2002 |
| EP | 1422673 | 5/2004 |
| EP | 1513117 | 3/2005 |
| GB | 1454046 | 10/1976 |
| GB | 2062922 | 5/1981 |
| GB | 2106293 | 9/1981 |
| GB | 2081952 | 2/1982 |
| GB | 2090690 | 7/1982 |
| GB | 2096376 | 10/1982 |
| GB | 2097160 | 10/1982 |
| GB | 2100905 | 1/1983 |
| GB | 2105891 | 3/1983 |
| GB | 2106295 | 4/1983 |
| GB | 2113881 | 8/1983 |
| GB | 2117155 | 10/1983 |
| GB | 2137392 | 10/1984 |
| GB | 2161008 | 1/1986 |
| GB | 2165385 | 4/1986 |
| GB | 2170643 | 8/1986 |
| GB | 2180087 | 3/1987 |
| GB | 2181589 | 4/1987 |
| GB | 2183882 | 6/1987 |
| GB | 2191030 | 12/1987 |
| GB | 2222712 | 3/1990 |
| GB | 2225889 | 6/1990 |
| GB | 2226436 | 6/1990 |
| GB | 2242300 | 9/1991 |
| GB | 2262642 | 6/1993 |
| GB | 2322217 | 8/1998 |
| GB | 2335524 | 9/1999 |
| GB | 2372132 | 2/2001 |
| GB | 2393555 | 3/2004 |
| WO | WO9732285 | 9/1997 |
| WO | WO9820949 | 5/1998 |
| WO | WO0030727 | 6/2000 |
| WO | WO0032286 | 6/2000 |
| WO | WO0066235 | 11/2000 |
| WO | WO0076606 | 12/2000 |
| WO | WO0126019 | 4/2001 |
| WO | WO03026756 | 4/2003 |
| WO | WO2004025584 | 3/2004 |
| WO | WO2005028043 | 3/2005 |
| WO | WO2006076294 | 7/2006 |
| WO | WO2007002935 | 1/2007 |
| WO | WO2007084766 | 7/2007 |
| WO | WO2007130443 | 11/2007 |
| WO | WO2007130444 | 11/2007 |

* cited by examiner

GAMING SYSTEM, GAMING DEVICE AND METHOD FOR PROVIDING A MULTIPLE DIMENSION CASCADING SYMBOLS GAME

CROSS REFERENCE TO RELATED APPLICATIONS

This application relates to the following co-pending commonly owned patent applications: "GAMING SYSTEM, GAMING DEVICE, AND METHOD FOR PROVIDING A MULTIPLE DIMENSION CASCADING SYMBOLS GAME WITH THREE DIMENSIONAL SYMBOLS," Ser. No. 13/187,629; and "GAMING SYSTEM, GAMING DEVICE, AND METHOD FOR PROVIDING A MULTIPLE DIMENSION CASCADING SYMBOLS GAME WITH A TIME ELEMENT," Ser. No. 13/187,642.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols in a symbol display matrix or grid. This symbol display matrix includes a plurality of two-dimensional symbol display positions. Each symbol display position is associated with a specific row and a specific column of the symbol display matrix. In such a cascading symbol game, the gaming machine evaluates the displayed symbols and provides an award for each winning symbol combination formed. The gaming machine then removes the displayed symbols that form the winning combination(s) of symbols to create one or more empty symbol display positions. The gaming machine shifts zero, one, or more of the remaining displayed symbols downward into zero, one, or more of the created empty symbol display positions. If any empty symbol display positions remain, the gaming machine generates and displays a symbol for each remaining empty symbol display position. The gaming machine then reevaluates the displayed symbols and provides an award for any winning symbol combinations formed. If winning symbol combinations continue to be formed, the gaming machine repeats the steps of removing generated symbols, shifting generated symbols, generating new symbols, and evaluating generated symbols.

There is a continuing need to increase the level of excitement and entertainment for people playing gaming machines.

There is also need for new ways of providing better gaming experiences and environments at gaming machines. There is a further need for increasing the number of winning symbol combinations generated and awards provided to a player for a single wager on a play of a game.

SUMMARY

The present disclosure relates generally to gaming systems, gaming devices, and methods for providing a multi-dimensional cascading symbol game.

In various embodiments, the gaming system disclosed herein includes a cascading symbol or tumbling reel game which utilizes a plurality of adjacent symbol display position grids arranged at a plurality of different depths. Each symbol display position grid at each depth includes a plurality of columns of symbol display positions and a plurality of rows of symbol display positions. Such an arrangement of multiple symbol display position grids at different depths provides that one or more of the generated symbols of at least a first symbol display position grid at a first depth are initially displayed to a player while one or more of the generated symbols of at least a second symbol display position grid at a second depth are not initially displayed to the player (i.e., are blocked by one or more of the generated symbols of the first symbol display position grid at the first depth). In operation of this cascading symbol game, when one or more symbols are removed from the first symbol display position grid at the first depth, before and/or after shifting zero, one, or more of the remaining displayed symbols from the first symbol display position grid into zero, one, or more of the created empty symbol display positions of the first symbol display position grid, one or more symbols from the second symbol display position grid at the second depth become revealed or displayed to the player. Such revealed symbols from the second symbol display position grid are then evaluated (in combination with zero, one or more symbols from one or more other symbol display position grids at different depths) to determine any additional awards to provide to the player. Accordingly, the gaming system disclosed herein is configured to increase a level of excitement and enjoyment for players by introducing an aspect of multiple dimension symbols into a cascading symbol or tumbling reel game.

In one embodiment, the gaming system disclosed herein includes a plurality of matrices or grids of symbol display positions. Each matrix or grid includes a plurality of symbol display positions. Each symbol display position of each matrix is associated with a specific row, a specific column and a specific depth. In one such embodiment, each matrix or grid of symbol display positions is formed from a different set of a plurality of reels. In another such embodiment, the plurality of matrices or grids of symbol display positions are formed from a single set of a plurality of reels. In this embodiment, each reel of the plurality of reels is associated with a plurality of symbol stacks. Each symbol stack includes an initially displayed symbol (i.e., a symbol from a first symbol display position grid at a first depth) and at least one initially hidden symbol (i.e., at least one symbol from another symbol display position grid at another depth).

In one embodiment, for a play of a wagered on game, the gaming system generates one of a plurality of symbols at each of the symbol display positions. The gaming system initially displays the symbols generated at each of the symbol display positions of a first one of the symbol display position matrices. In this embodiment, since at least a second one of the symbol display position matrices is at least partially positioned behind the first one of the symbol display position matrices (relative to the player's line of sight), at least one of the symbols generated in at least one of the symbol display positions of the second one of the symbol display position matrices is not initially displayed to the player. In other words, the utilization of a plurality of different symbol display position matrices or grids of generated symbols at different depths provides that at different times during the play of the game, certain symbols will be exposed to the player and certain symbols will be hidden from the player.

After generating a symbol in each symbol display position, the gaming system evaluates the generated symbols displayed to the player to determine if any winning symbols or winning symbol combinations are formed. The gaming system provides the player any awards associated with any formed winning displayed symbols or any formed winning displayed symbol combinations.

After the evaluation, the gaming system removes zero, one, or more displayed symbols to leave zero, one, or more empty symbol display positions in the first symbol display position grid or matrix. After such removal, if any empty symbol display positions are formed in the first symbol display position grid, the gaming system fills at least one of the empty symbol display positions of the first symbol display position grid. In one embodiment, the gaming system fills such empty symbol display positions by shifting at least one generated symbol displayed in a symbol display position of the first symbol display position into that empty symbol display position of the first symbol display position grid. In this embodiment, the shifting of one or more symbols of the first symbol display position grid into empty symbol display positions of the first symbol display position grid results in the creation of different empty symbol display positions of the first symbol display position grid and thus the exposure of symbols generated in symbol display positions of another symbol display position grid positioned at another depth. That is, the removal of generated symbols, shifting of generated symbols and creation of empty symbol display positions of one symbol display position grid results in the gaming system displaying generated but previously hidden symbols from another symbol display position grid (which is positioned, relative to the player's line of sight, behind the symbol display position grid with the removed symbols). In other words, unlike known two dimensional cascading reel games (which generate symbols from above the symbol display position grid to fill in any holes created by the removal of certain symbol), the present disclosure includes a three dimensional cascading reel game which accounts for any holes created by the removal of certain symbols from one symbol display position grid by exposing symbols from another symbol display position grid which is at a different depth.

After exposing zero, one or more previously hidden symbols, the gaming system repeats the described process of evaluating displayed symbols, removing symbols and shifting symbols within a single symbol display position grid to reveal generated symbols in different symbol display position grids at different depths. This repeated process continues until no winning symbol or winning symbol combination is displayed. In the event that an empty symbol display position is created in a symbol display position grid and no symbols from any other symbol display grids are revealed behind the created empty symbol display position, the gaming system generates one or more symbols at one or more of the created empty symbol display positions and then proceeds as described above until no winning symbol or winning symbol combination is displayed. Such a configuration provides the player with additional opportunities to win awards in association with a plurality of matrices of symbol display positions.

In various embodiments, the gaming system utilizes one or more multiple dimension symbols in the multiple dimension cascading symbol game disclosed herein. In these embodiments, rather than each generated symbol including a length component and a width component (i.e., a two dimensional tile with a symbol on the face of the tile), each generated symbol also includes a depth component (i.e., a three dimensional shape with individually symbols on each side or face of the three dimensional shape). In this embodiment, when zero, one, or more empty symbol display positions are created in a symbol display position grid or matrix, not only is one side or face of the multiple dimension symbol of another symbol display position grid exposed, but one or more sides or faces of zero, one or more multiple dimension symbols of the same symbol display position grid are exposed. That is, the removal of a multiple dimension symbol from a symbol display position grid results in previously hidden sides of other multiple dimension symbols from the same symbol display position grid becoming exposed for evaluation purposes.

In one such embodiment employing multiple dimension symbols, for one play of the game, the gaming system evaluates the symbols exposed on a plurality of faces or sides of a plurality of multiple dimension symbols. In this embodiment, when a plurality of multiple dimension symbols are generated in the symbol display positions of each of the plurality of symbol display position grids, zero, one or more of the multiple dimension symbols from the plurality of symbol display position grids form a plurality of multiple dimension symbol display position planes or surfaces. These multiple dimension symbol display position planes or surfaces each include one or more symbol display positions from one or more of the symbol display position grids at one or more depths. For example, if the plurality of symbol display position grids form a cube, from an isometric view, the displayed faces or sides of the multiple dimension symbols (from a plurality of the symbol display position grids at different depths) on the left side of the cube would form one multiple dimension symbol display position plane and the displayed faces or sides of the multiple dimension symbols (from a plurality of the symbol display position grids at different depths) on the top side of the cube would form another multiple dimension symbol display position plane. In this example, the displayed faces or sides of the multiple dimension symbols on the front side of the cube represent the multiple dimension symbols generated in the plurality of symbol display positions of one of the symbol display position grids.

In this embodiment, for each plane or surface of the multiple dimension symbol display position grid displayed to the player, the gaming system evaluates the symbols displayed on the faces of the multiple dimension symbols associated with that plane or surface. As described above, for each displayed plane or surface of the multiple dimension symbol display position grid, the gaming system removes any multiple dimension symbols from any winning symbol combinations, and shifts any multiple dimension symbols to reveal generated multiple dimension symbols in different symbol display position grids at the same depth or at different depths. This process is repeated until no winning symbol or winning symbol combination is displayed to the player.

In another embodiment, the multi-dimensional tumbling reels game disclosed herein utilizes the fourth dimension of time to determine any awards to be provided to a player. In one such embodiment, for a plurality of plays of the multi-dimensional tumbling reels game, the gaming system tracks and stores the different symbols generated in the different symbol display positions of the symbol display position grids. In this embodiment, the gaming system determines an award to provide to the player based on how the symbols generated in the symbol display positions of the symbol display position grids for a current play of this multi-dimensional tumbling reels game compare to the tracked and stored symbols generated in the symbol display positions of the symbol display position grids for one or more previous plays of this multi-dimensional tumbling reels game. In another such embodiment, certain symbols are associated with a duration of time/quantity of winning symbol combinations which those symbols remain in one of the symbol display grids. In this embodiment, if such symbols are generated in the symbol display positions of the symbol display position grids and such symbols form part of a winning symbol combination, then as long as the associated duration of time/quantity of winning symbol combinations has not expired, such symbols are not removed from the symbol display positions of the symbol display position grids. Such embodiments provide an additional entertaining feature for players playing the multi-dimensional tumbling reels game.

The gaming system and method of the present disclosure thus provides a game having increased volatility due to the utilization of a plurality of symbol display position matrices of different depths. Specifically, the gaming system provides a player with an opportunity to win multiple awards for a single play of the game based on the shifting of symbols in one matrix to expose other symbols in another matrix for additional award determinations during the same play of the game.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a “thin client” embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a “thick client” embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
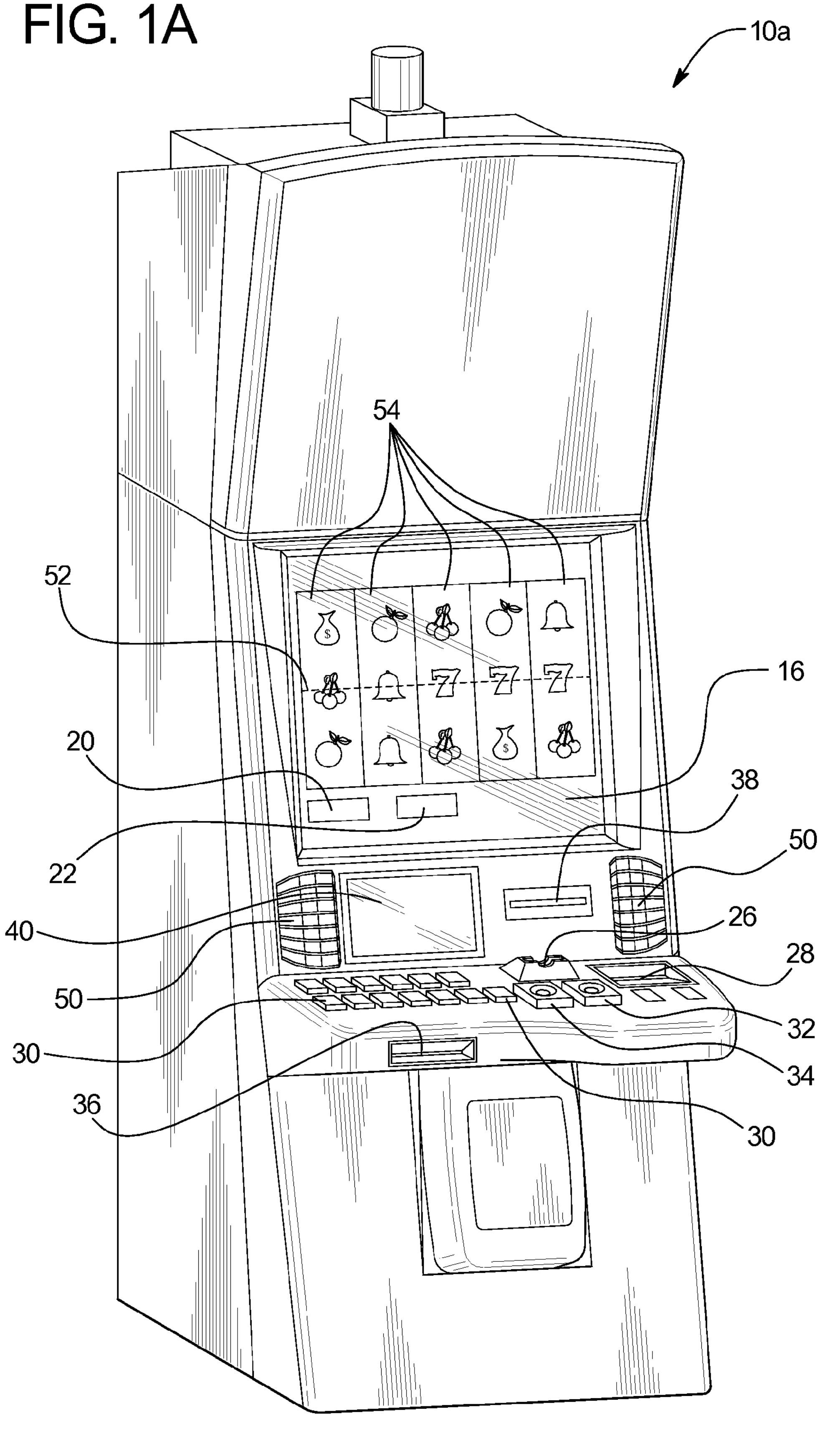
FIGS. 1A and 1B are perspective views of example alternative embodiments of the gaming device of the present disclosure.
Figure 1B:
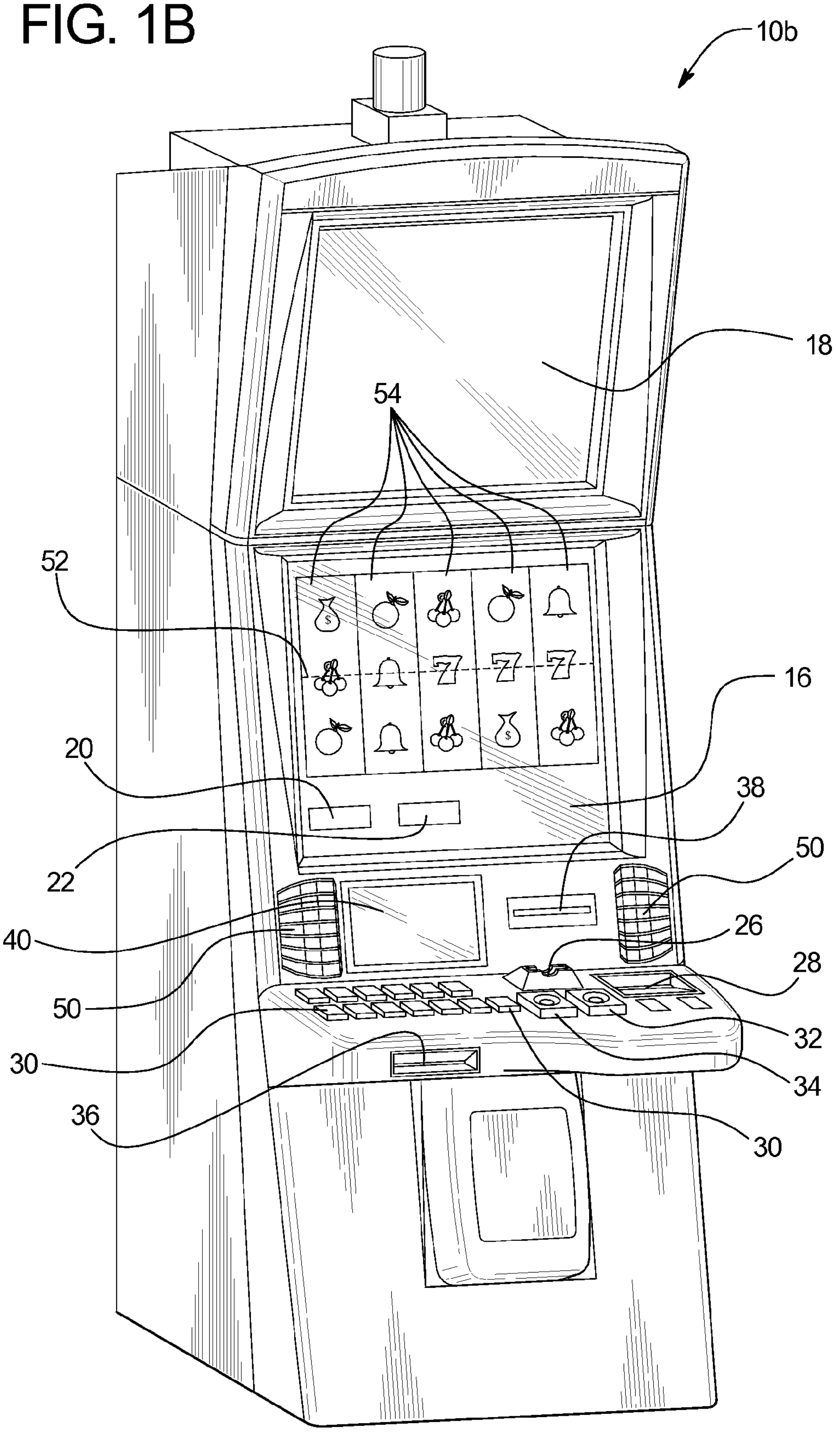

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
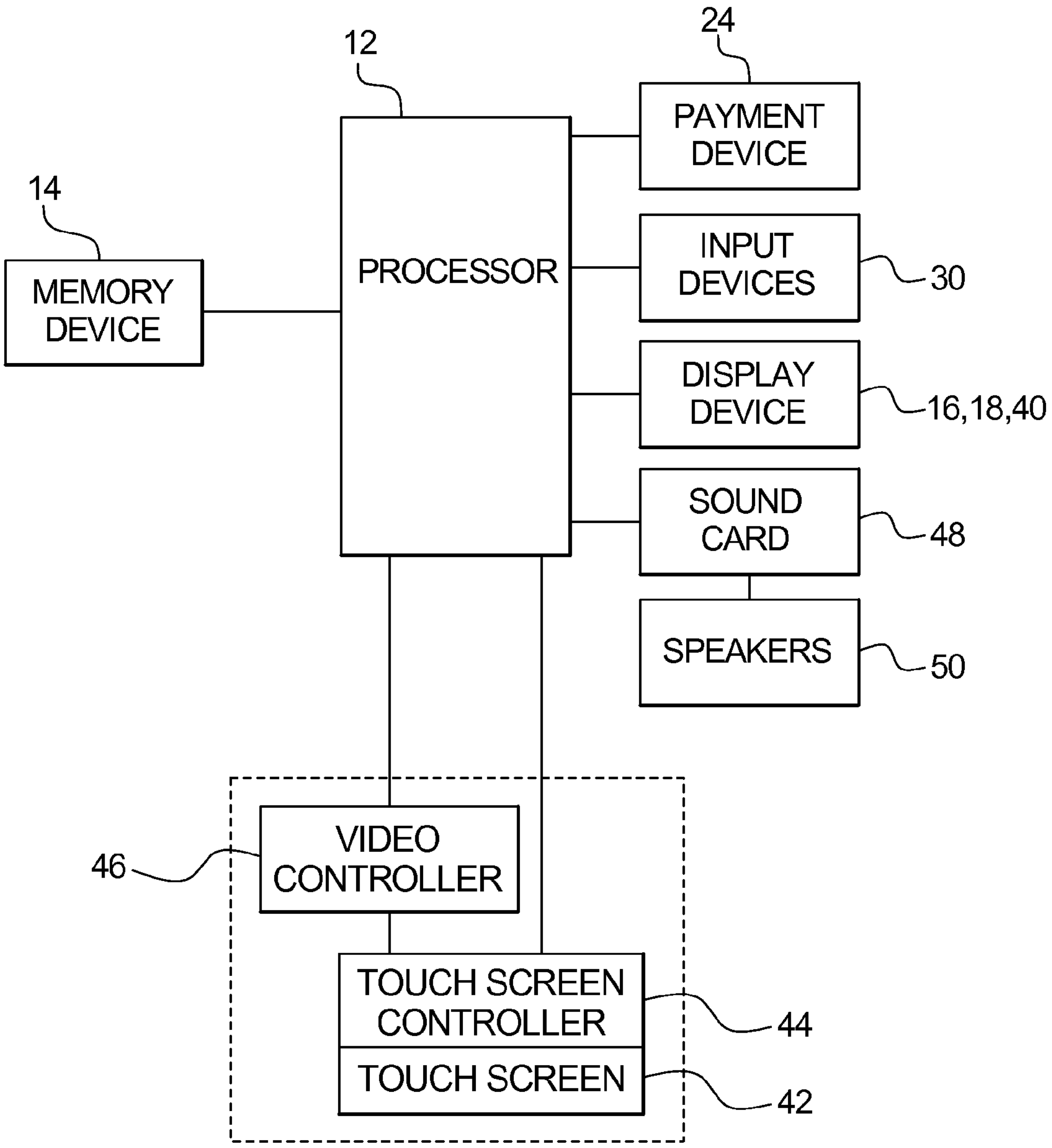
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
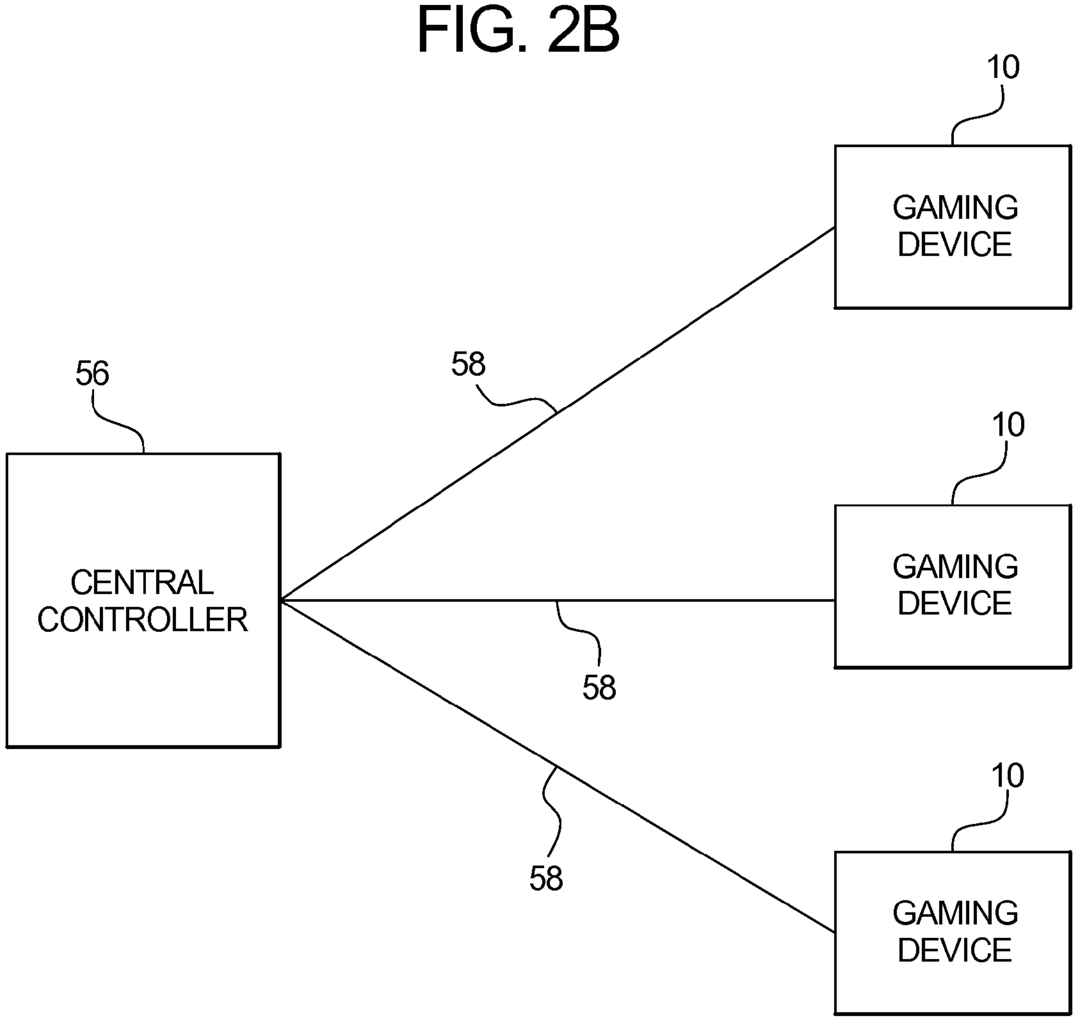
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple Dimension Cascading Symbols

Figure 3:
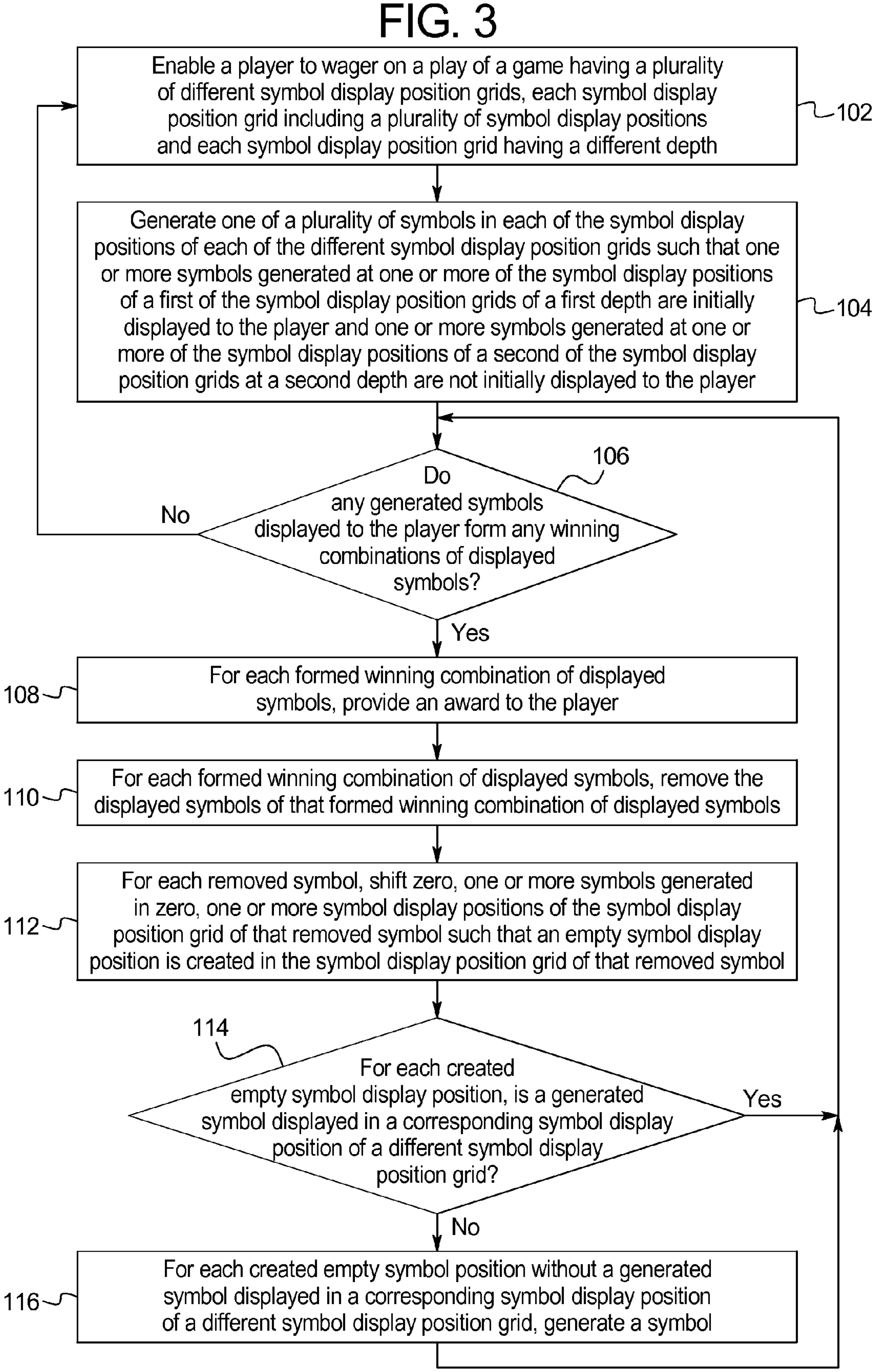
FIG. 3 is a flow chart an example process for operating a gaming system providing the multi-dimensional cascading symbol game disclosed herein.

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

In one embodiment, the disclosed gaming system enables a player to wager on a play of a game having a plurality of different symbol display position grids as indicated in block 102.

Each symbol display position grid includes a plurality of symbol display positions arranged in a plurality of rows and a plurality of columns. Each symbol display position grid also has a different depth. Thus, each symbol display position of each symbol display position grid is associated with a specific row, a specific column and a specific depth. Moreover, in each symbol display position grid, one or more symbol display positions are aligned with or otherwise correspond with one or more symbol display positions of one or more symbol display position grids of different depths. That is, one or more symbol display position grids are positioned (relative to the player's line of sight) behind one or more other symbol display position grids and thus one or more symbol display positions of one or more symbol display position grids are positioned (relative to the player's line of sight) behind one or more symbol display positions of one or more other symbol display position grids.

In one embodiment, one or more paylines of any suitable direction extend through a plurality of symbol display positions of a symbol display position grid at one depth. In another embodiment, one or more paylines of any suitable direction extend through a plurality of symbol display positions of a plurality of symbol display position grids at a plurality of different depths. In these embodiment, the gaming system enables the player to wager on one or more of such paylines. In another embodiment, one or more ways to win are associated with a plurality of symbol display positions of a symbol display position grid at one depth. In another embodiment, one or more ways to win are associated with a plurality of symbol display positions of a plurality of symbol display position grids at a plurality of different depths. In these embodiment, the gaming system enables the player to wager on quantity of active symbol display positions or a quantity of ways to win.

The gaming system generates one of a plurality of symbols at each of the symbol display positions of each of the different symbol display position grids as indicated in block 104. Such generation results in one or more symbols generated at one or more of the symbol display positions of a first of the symbol display position grids of a first depth being initially displayed to the player and one or more symbols generated at one or more of the symbol display positions of a second of the symbol display position grids at a second depth are not initially displayed to the player. Put differently, since at least a second one of the symbol display position grids is at least partially positioned behind the first one of the symbol display position grids (relative to the player's line of sight), at least one of the symbols generated at at least one of the symbol display positions of the second one of the symbol display position grids is masked by at least one symbol generated at at least one of the symbol display positions of another symbol display position grid and thus not initially displayed to the player.

In one embodiment, each symbol display position grid is associated with a different set of a plurality of reels. In this embodiment, when the gaming system generates one of a plurality of symbols at each of the symbol display positions of each of the different symbol display position grids, the gaming system causes each of the sets of reels to generate one or more symbols for the symbol display position grid associated with that set of reels. In another embodiment, the plurality of symbol display position grids are associated with a single set of a plurality of reels. In this embodiment, such as described in U.S. Pat. No. 7,252,591, each reel of the plurality of reels is associated with a plurality of symbol stacks. Each symbol stack includes an initially displayed symbol and at least one initially hidden symbol. In this embodiment, when the gaming system generates one of a plurality of symbols at each of the symbol display positions of each of the different symbol display position grids, the gaming system causes the plurality of reels to generate a plurality of symbol stacks wherein one symbol (associated with a first symbol display position grid at a first depth) of the generated symbol stack is initially displayed to the player and another symbol (associated with another symbol display position grid at another depth) of the generated symbol stack is not initially displayed to the player. In another embodiment, one or more symbol display positions of one or more symbol display position grids are associated with different sets of reels and one or more symbol display positions of one or more symbol display position grids are associated with one or more symbol stacks.

In one embodiment, upon generating one of the plurality of symbols at each symbol display position, the gaming system determines whether any of the generated symbols displayed to the player form any winning combinations of displayed symbols as indicated in diamond 106 of FIG. 3. It should be appreciated that because certain generated symbols are not initially displayed to the player (i.e., certain generated symbols are blocked from being displayed by other symbols generated at different depths), the gaming system disclosed herein only evaluates the symbols currently displayed to the player for award evaluation purposes.

If no winning combination of displayed symbols is formed, the gaming system ends the play of the game and returns to block 102 to enable the player to place another wager on another play of the multi-dimensional cascading symbols game. On the other hand, if any winning combination of displayed symbols are formed, for each formed winning combination of displayed symbols, the gaming system provides to the player an award associated with that displayed winning symbol combination as indicated by block 108.

After providing the player any awards, for each formed winning combination of displayed symbols, the gaming system removes the displayed symbols of that formed winning combination of displayed symbols as indicated in block 110. Removing such symbols results in one or more empty symbol display positions which the gaming system may fill by shifting one or more other displayed symbols. Specifically, as indicated in block 112, for each removed symbol, the gaming system shifts zero, one or more symbols generated in zero, one or more symbol display positions of the symbol display position grid of that removed symbol. Such shifting results in, for each removed symbol, an empty symbol display position being created in the symbol display position grid of that removed symbol.

It should be appreciated that the creation of one or more empty symbol display positions at one symbol display position grid causes the exposure of symbols generated in symbol display positions of another grid positioned at another depth. Put differently, the removal of symbols, shifting of symbols and creation of empty symbol display positions of one symbol display position grid results in the gaming system displaying previously hidden symbols from another symbol display position grid (which is positioned, relative to the player's line of sight, behind the grid with the removed symbols). In other words, unlike known two dimensional cascading reel games (which generate symbols from above the symbol display position matrix to fill in any holes created by the removal of certain symbol), the present disclosure includes a three dimensional cascading reel game which accounts for any holes created by the removal of certain symbols from one symbol display position matrix by exposing symbols from another symbol display position matrix which is at a different depth.

After exposing zero, one or more previously hidden symbols, as indicated in diamond 114, for each created empty symbol display position, the gaming system determines whether a generated symbol is displayed in a corresponding symbol display position of a different symbol display position grid. The gaming system thus determines whether each created empty symbol display position reveals another symbol generated at another depth.

If any least one created empty symbol display position does not reveal another symbol generated at another depth, as indicated in block 116, the gaming system generates a symbol for each created empty symbol display position without a generated symbol displayed in a corresponding symbol display position of a different symbol display position grid. The gaming system then returns to diamond 106 and again determines if any of the generated symbols currently displayed to the player form any winning combinations of displayed symbols. On the other hand, if each created empty symbol display position reveals another symbol of another symbol display position of another symbol display position grid of a different depth, the gaming system returns to diamond 106 and again determines if any of the generated symbols currently displayed to the player form any winning combinations of displayed symbols.

It should be appreciated that when determining if any awards are associated with the currently displayed symbols, the gaming system may evaluate symbols displayed at a plurality of symbol display positions of a plurality of symbol display position grids of a plurality of different depths. That is, since the gaming system only evaluates the symbols that are currently displayed to the player and different symbols positioned at different depths may be currently displayed to the player (due to the removal and/or shifting of symbols positioned in front of these symbols), the gaming system is configured to evaluate symbols displayed at different depths to determine any additional awards to provide to the player. Such a configuration provides the player with additional opportunities to win awards in association with a plurality of grids of symbol display positions. In this embodiment, the disclosed gaming system enables a play of the multi-dimensional cascading symbols game to continue so long as one or more winning symbol combinations continue to be displayed to the player.

Figure 4A:
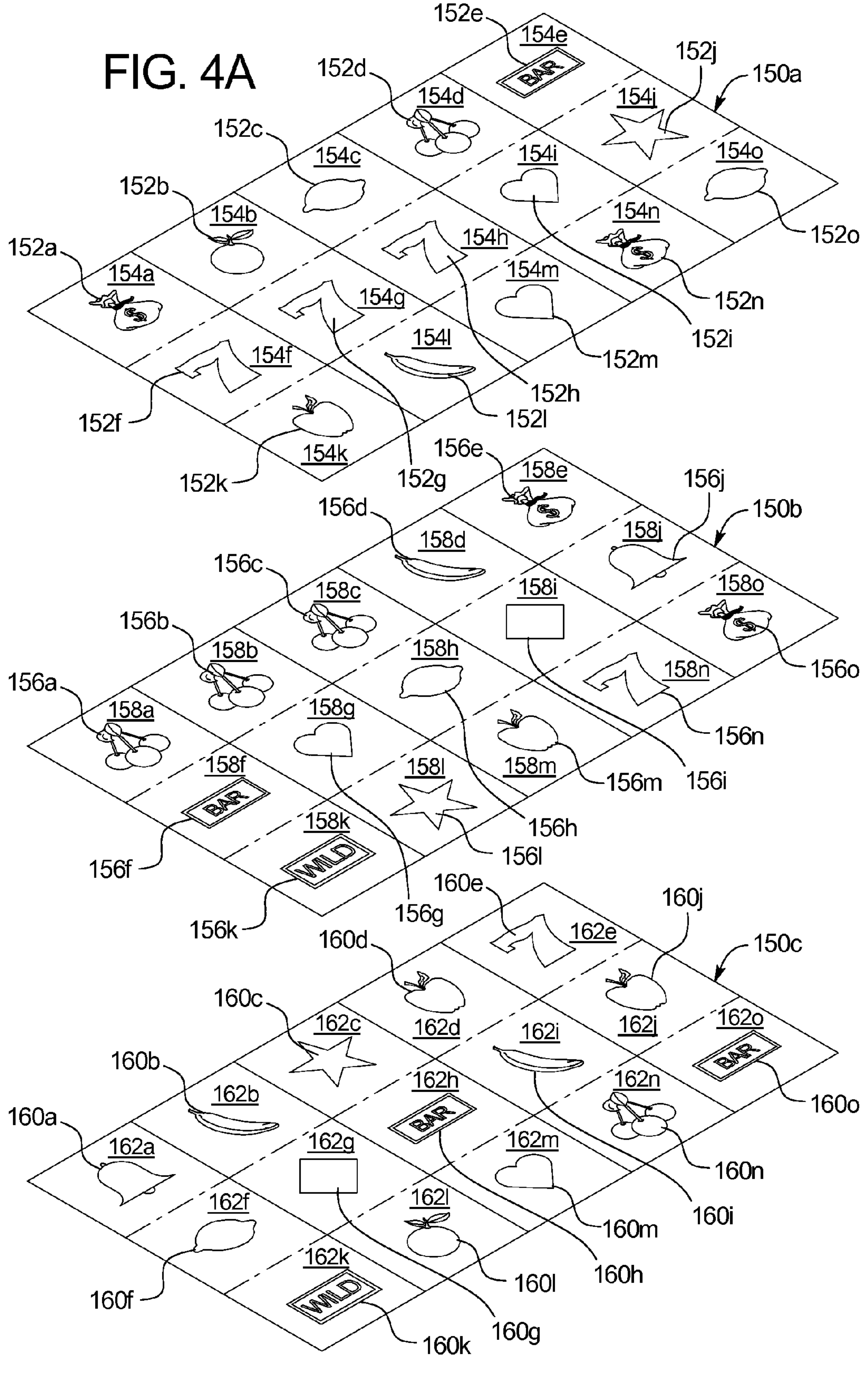
FIG. 4A is a front perspective view of one embodiment of the gaming system disclosed herein illustrating a plurality of symbols generated in a plurality of symbol display positions of a plurality of symbol display position grids at a plurality of different depths.
Figure 4B:
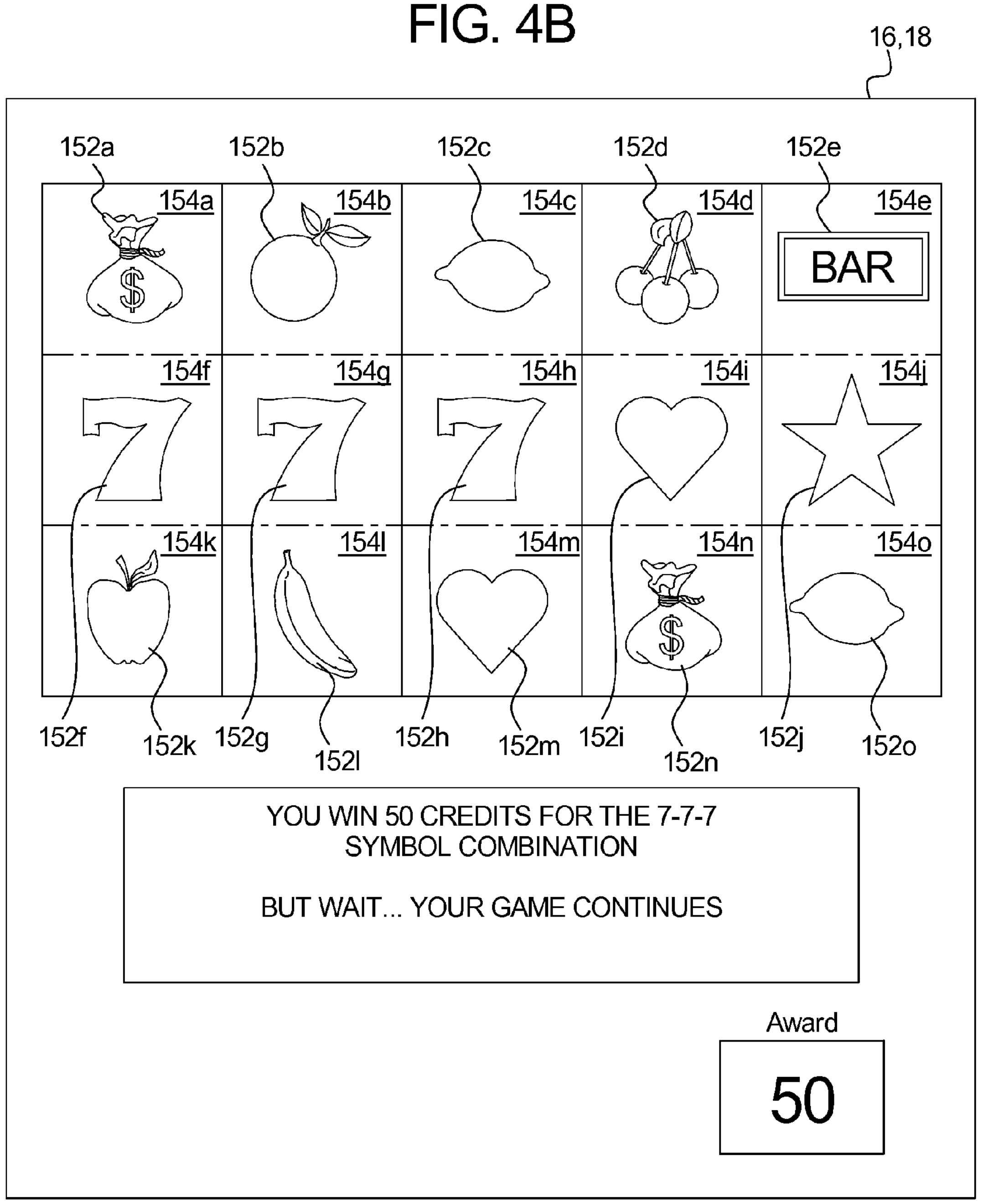
FIGS. 4B, 4C, 4D, 4E, 4F and 4G are front views of the embodiment of the gaming system of FIG. 4A illustrating a play of the multi-dimensional cascading symbol game.

As illustrated in FIG. 4A, in one example embodiment of a play of the multi-dimensional cascading symbol game disclosed herein, the gaming system generates a plurality symbols at a plurality of symbol display positions at each of a plurality of symbol display position grids 150*a*, 150*b* and 150*c* of different depths. Specifically, the gaming system: (i) generates a plurality of symbols 152 at a plurality of symbol display positions 154 of symbol display position grid 150*a*, (ii) generates a plurality of symbols 156 at a plurality of symbol display positions 158 of symbol display position grid 150*b*, and (iii) generates a plurality of symbols 160 at a plurality of symbol display positions 162 of symbol display position grid 150*c*. As seen in FIGS. 4A and 4B, because symbol display position grids 150*b* and 150*c* are positioned behind symbol display position grid 150*a*, the symbols 156 and 160 generated at the plurality of symbol display positions 158 and 162 of symbol display position grids 150*b* and 150*c* are not initially displayed to the player.

As seen in FIG. 4B, after generating a plurality of symbols, the gaming system determines that the displayed symbol combination of seven symbol-seven symbol-seven symbol in the middle or second row of symbol display position grid 150*a* is a winning symbol combination. Accordingly, the gaming system provides an award of fifty credits to the player and provides appropriate messages such as "YOU WIN 50 CREDITS FOR THE 7-7-7 SYMBOL COMBINATION" and "BUT WAIT . . . YOUR GAME CONTINUES" to the player visually, or through suitable audio or audiovisual displays.

Figure 4C:
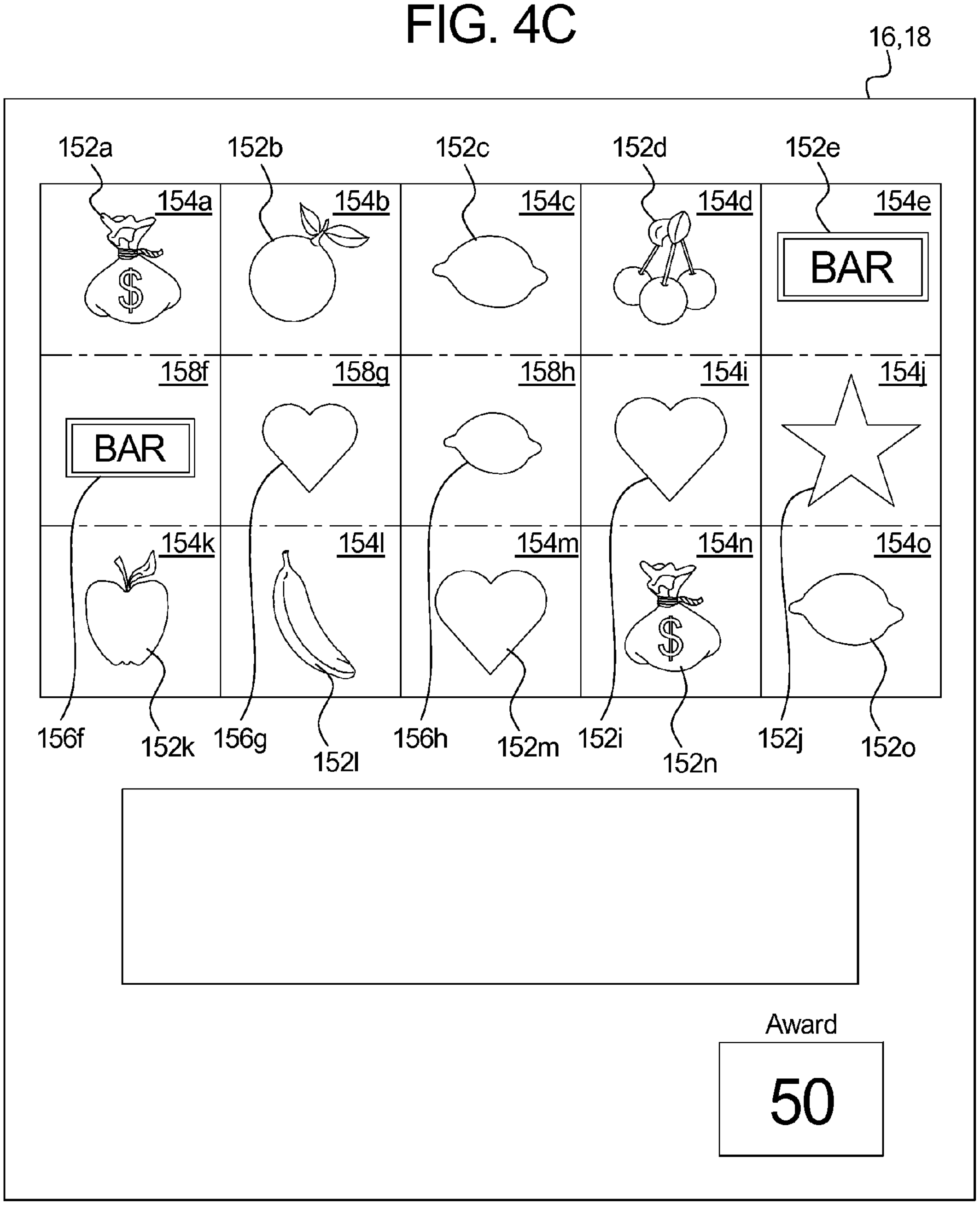

As seen in FIG. 4C, the gaming system then removes each of the symbols of the displayed winning symbol combination of seven symbol-seven symbol-seven symbol. In this example, the removal of the symbols 152*f*, 152*g* and 152*h* of the displayed winning symbol combination of seven symbol-seven symbol-seven symbol from the middle row of symbol display position grid 150*a* (as seen in FIG. 4B) causes empty symbol display positions 154*f*, 154*g* and 154*h* in symbol display position grid 150*a*. As seen in FIG. 4C, such empty symbol display positions thus causes certain of the symbols 156*f*, 156*g* and 156*h* generated at symbol display positions 158*f*, 158*g* and 158*h* of the middle or second row of symbol display position grid 150*b* to be displayed to the player. Thus, the creation of one or more empty symbol display positions in a front symbol display position grid (relative to the player's line of sight) causes one or more symbols at one or more corresponding symbol display positions of another symbol display position grid (which is, relative to the player's line of sight, behind the front symbol display position grid) to become displayed to the player.

Figure 4D:
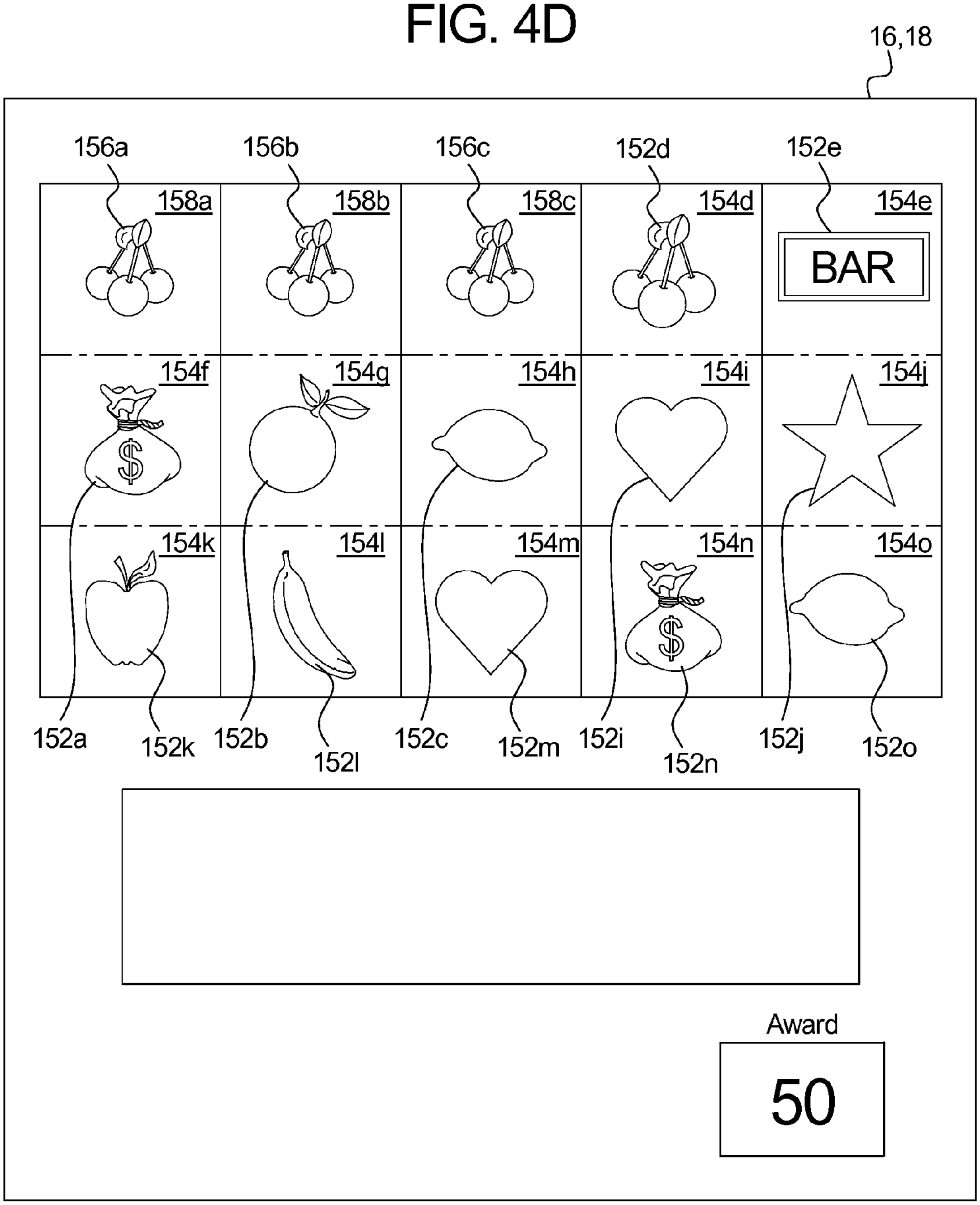

As seen in FIG. 4D, the revealing of certain of the symbols of the middle row of symbol display position grid 150*b* is temporary because following the removal of the symbols 152*f*, 152*g* and 152*h* from the middle row of symbol display position grid 150*a* (as seen in FIG. 4B), the gaming system shifts one or more symbols from the symbol display position grid 150*a* downward to fill the empty symbol display positions created from any removed symbols from this symbol display position grid. In the illustrated embodiment, the disclosed gaming system shifts symbols 152*a*, 152*b* and 152*c* from the top row of symbol display position grid 150*a* downward into symbol display positions 154*f*, 154*g* and 154*h* of the second or middle row of symbol display position grid 150*a* to fill the created empty symbol display positions. In this example, the shifting of the symbols from the top row of symbol display position grid 150*a* downward into symbol display positions of the second or middle row of symbol display position grid 150*a* causes different empty symbol display positions 154*a*, 154*b* and 154*c* in symbol display position grid 150*a* to be created. As seen in FIG. 4D, such different empty symbol display positions thus causes certain of the symbols 156*a*, 156*b* and 156*c* generated at symbol display positions 158*a*, 158*b* and 158*c* of the top or first row of symbol display position grid 150*b* to be displayed to the player.

Figure 4E:
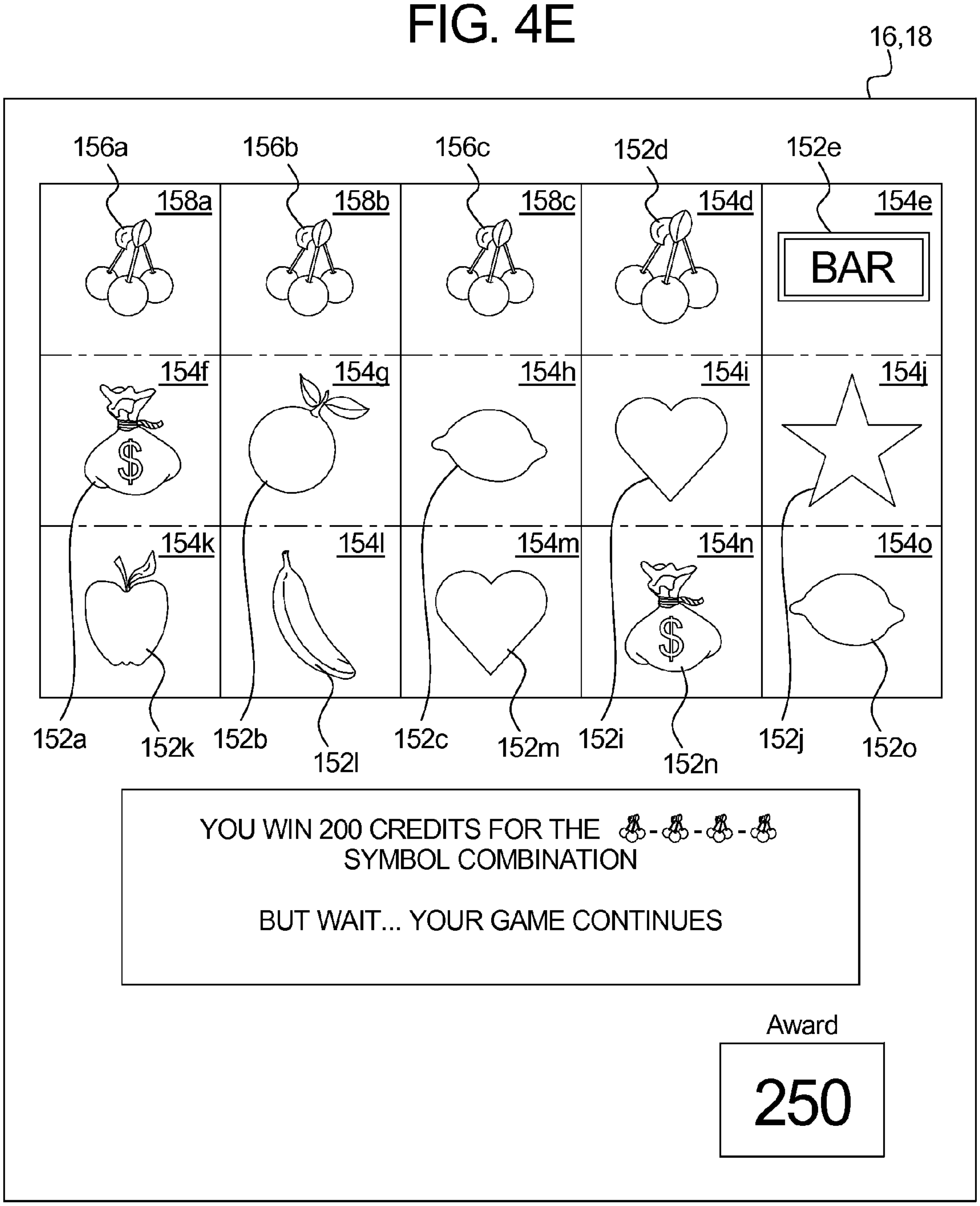

After removing one or more symbols from one of the symbol display position grids, shifting zero, one or more symbols from that symbol display position grid and revealing one or more symbols from another one of the symbol display position grids, as seen in FIG. 4E, the gaming system determines that the displayed symbol combination of cherry symbol-cherry symbol-cherry symbol-cherry symbol in the displayed top or first row is a winning symbol combination. Accordingly, the gaming system provides an award of two-hundred credits to the player and provides appropriate messages such as "YOU WIN 200 CREDITS FOR THE CHERRY-CHERRY-CHERRY-CHERRY SYMBOL COMBINATION" and "BUT WAIT . . . YOUR GAME CONTINUES" to the player visually, or through suitable audio or audiovisual displays. It should be appreciated that this winning combination of displayed symbols includes at least one displayed symbol 152*d* generated at a symbol display position 154*d* in association with the symbol display position grid 150*a* and at least one display symbol 156*a*, 156*b* and 156*c* generated at symbol display positions 158*a*, 158*b* and 158*c* in association with symbol display position grid 150*b*. Accordingly, in one embodiment, the gaming system evaluates the symbols displayed to the player regardless of in which symbol display position grid such symbols were generated.

Figure 4F:
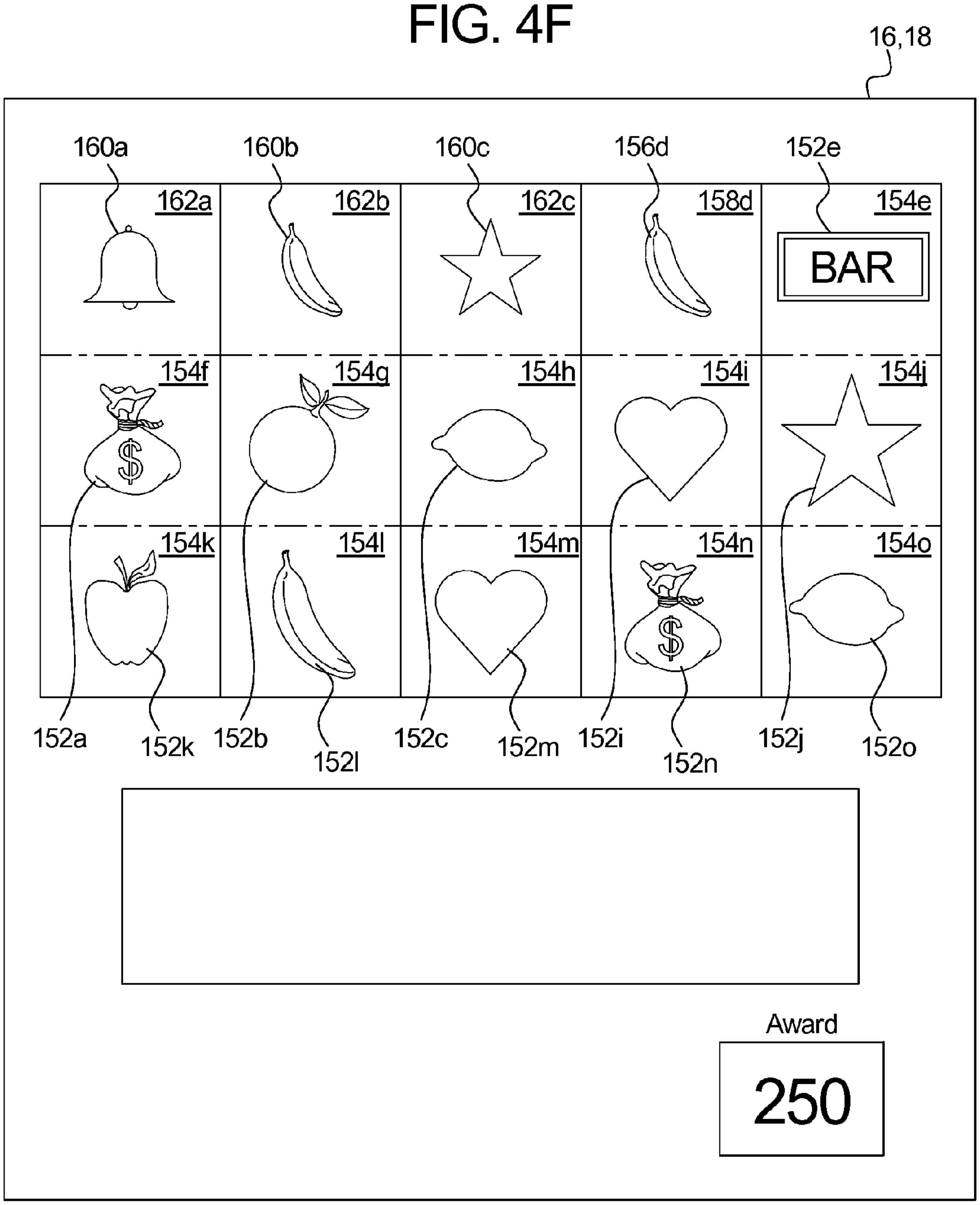

The gaming system then removes each of the symbols of the displayed winning symbol combination of cherry symbol-cherry symbol-cherry symbol-cherry symbol. In this example, the removal of the symbols of the displayed winning symbol combination of cherry symbol-cherry symbol-cherry symbol-cherry symbol causes one empty symbol display position 154*d* in symbol display position grid 150*a* and three empty symbol display positions 158*a*, 158*b* and 158*c* in symbol display position grid 150*b*. This creation of a plurality of empty symbol display positions in a plurality of different symbol display position grids of different depths causes a plurality of the symbols generated at a plurality of different symbol display position grids of a plurality of different depths to be simultaneously displayed to the player. Specifically, as seen in FIGS. 4E and 4F, the creation of one empty symbol display position 154*d* in symbol display position grid 150*a* and three empty symbol display positions 158*a*, 158*b* and 158*c* in symbol display position grid 150*b* causes one symbol 156*d* generated at symbol display position 158*d* from symbol display position grid 150*b* to be displayed to the player and further causes three symbols 160*a*, 160*b* and 160*c* generated at symbol display positions 162*a*, 162*b* and 162*c* from symbol display position grid 150*c* to be displayed to the player.

Figure 4G:
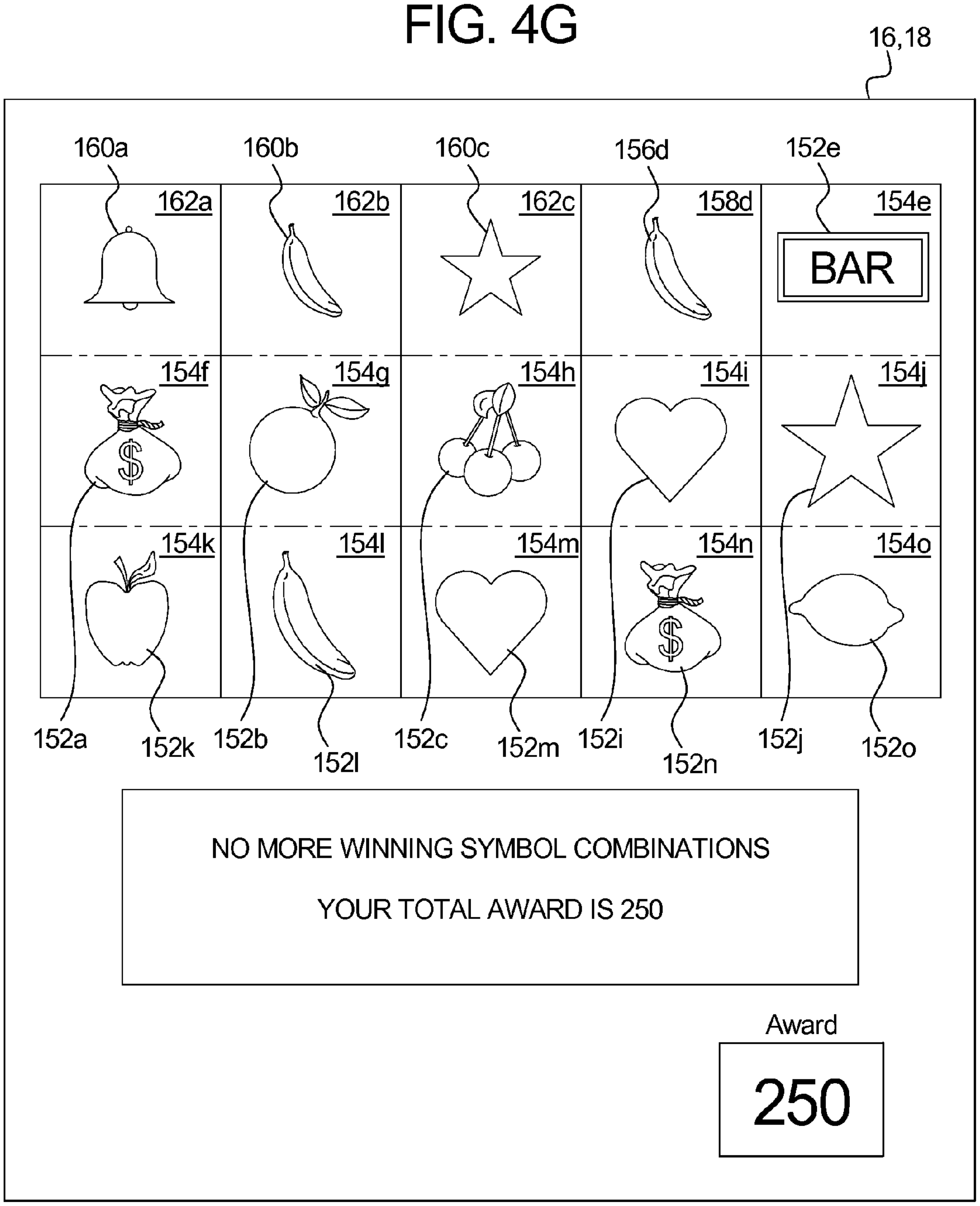

After removing one or more symbols from one of the symbol display position grids, shifting zero, one or more symbols from that symbol display position grid and revealing one or more symbols from another one of the symbol display position grids, as seen in FIG. 4G, the gaming system determines that no displayed symbols form any winning symbol combinations. Accordingly, the gaming system ends the play of the multi-dimensional cascading symbol game and provides appropriate messages such as "NO MORE WINNING SYMBOL COMBINATIONS" and "YOUR TOTAL AWARD IS 250" to the player visually, or through suitable audio or audiovisual displays.

In another embodiment, one or more of the generated symbols are multiple dimension symbols including a depth component. For example, one or more multiple dimension symbols each include a six-sided or hexagonal shape with individually displayed symbols on each side or face of the multi-dimensional shape. In another example, one or more multiple dimension symbols each include a four-sided square or rectangular shape with individually displayed symbols on each side or face. In another example, one or more multiple dimension symbols each include a three-sided or triangular shape with individually displayed symbols on each side or face. In an alternative embodiment, one or more faces or sides of one or more multiple dimension symbols do not include an individually displayed symbol. It should be appreciated that such multiple dimension symbols can include any suitable number of sides and any suitable number of individually displayed symbols per side.

In one embodiment utilizing such multiple dimension symbols, when zero, one, or more empty symbol display positions are created in a symbol display position grid (due to the above-described removal of one or more symbols), not only is one side or face of the multiple dimension symbol of another symbol display position grid of a different depth exposed, but one or more sides or faces of one or more multiple dimension symbols of the same symbol display position grid of the removed symbol may be exposed. That is, the removal of a multiple dimension symbol from a symbol display position grid results in previously hidden sides of other multiple dimension symbols from the same symbol display position grid becoming exposed for award evaluation purposes.

Figure 5A:
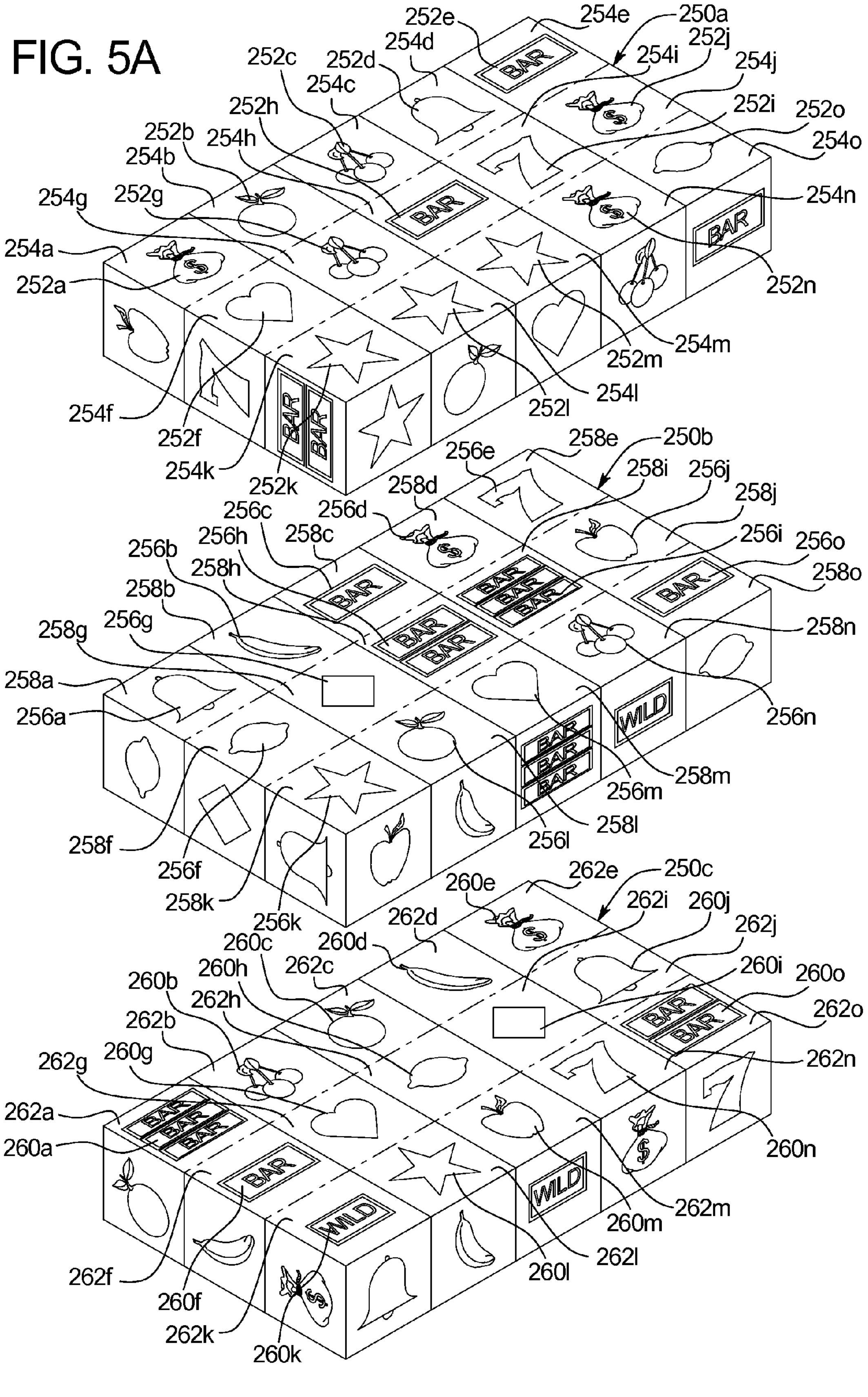
FIG. 5A is a front perspective view of one alternative embodiment of the gaming system disclosed herein illustrating a plurality of multiple dimension symbols generated in a plurality of symbol display positions of a plurality of symbol display position grids at a plurality of different depths.

For example, as seen in FIG. 5A, in one example embodiment of a play of the multi-dimensional cascading symbol game disclosed herein, the gaming system generates a plurality multiple dimension symbols at a plurality of symbol display positions of each of a plurality of symbol display position grids 250*a*, 250*b* and 250*c* of different depths. Specifically, the gaming system: (i) generates a plurality of multiple dimension symbols 252 at a plurality of symbol display positions 254 of symbol display position grid 250*a*, (ii) generates a plurality of multiple dimension symbols 256 at a plurality of symbol display positions 258 of symbol display position grid 250*b*, and (iii) generates a plurality of multiple dimension symbols 260 at a plurality of symbol display positions 262 of symbol display position grid 250*c*.

Figure 5B:
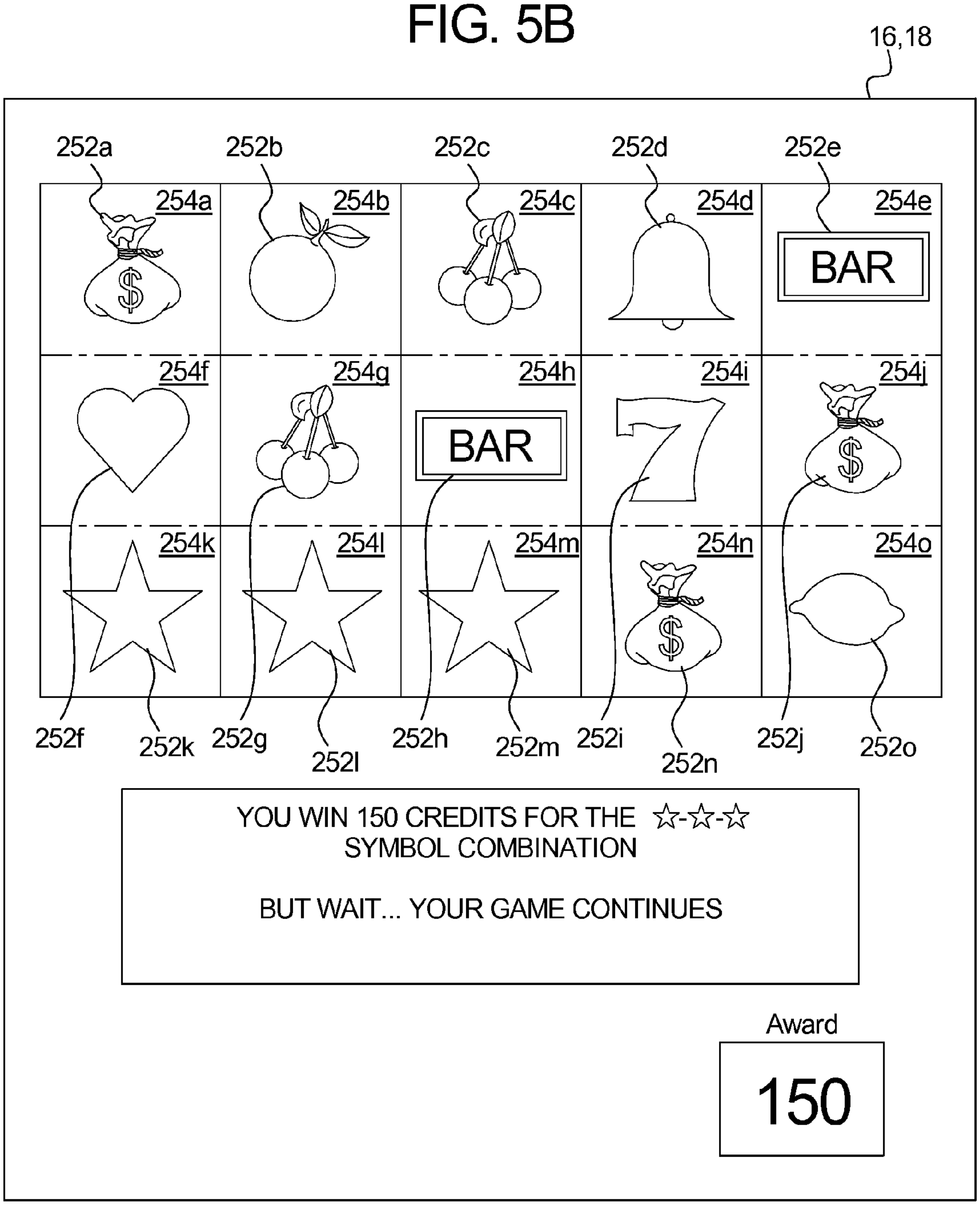
FIGS. 5B, 5C, 5D, and 5E are front views of the alternative embodiment of the gaming system of FIG. 5A illustrating a play of the multi-dimensional cascading symbol game utilizing multiple dimension symbols.

As seen in FIGS. 5A and 5B, because symbol display position grids 250*b* and 250*c* are positioned behind symbol display position grid 250*a*, the multiple dimension symbols 256 and 260 generated at the plurality of symbol display positions 258 and 262 of symbol display position grids 250*b* and 250*c* are not initially displayed to the player. It should be appreciated that the configuration of the multiple dimension symbols causes one or more of the faces or sides of certain multiple dimension symbols to be hidden from or otherwise not displayed to the player. For example, as seen in FIGS. 5A and 5B, the configuration of the multiple dimension symbols cause only one side or face of certain of the multiple dimension symbols generated in the plurality of symbol display positions 254 of symbol display position grid 250*a* to be initially displayed to the player.

After generating a plurality of multiple dimension symbols, the gaming system evaluates the symbols currently displayed to the player to determine if any awards are associated with any currently displayed symbol combinations. Specifically, as seen in FIG. 5B, the gaming system evaluates each of the displayed sides or faces of the displayed multiple dimension symbols from symbol display position grid 250*a* to determine that the displayed combination of star symbol-star symbol-star symbol in the bottom or third row of symbol display position grid 250*a* is a winning symbol combination. Accordingly, the gaming system provides an award of one-hundred-fifty credits to the player and provides appropriate messages such as "YOU WIN 150 CREDITS FOR THE STAR-STAR-STAR SYMBOL COMBINATION" and "BUT WAIT . . . YOUR GAME CONTINUES" to the player visually, or through suitable audio or audiovisual displays.

Figure 5C:
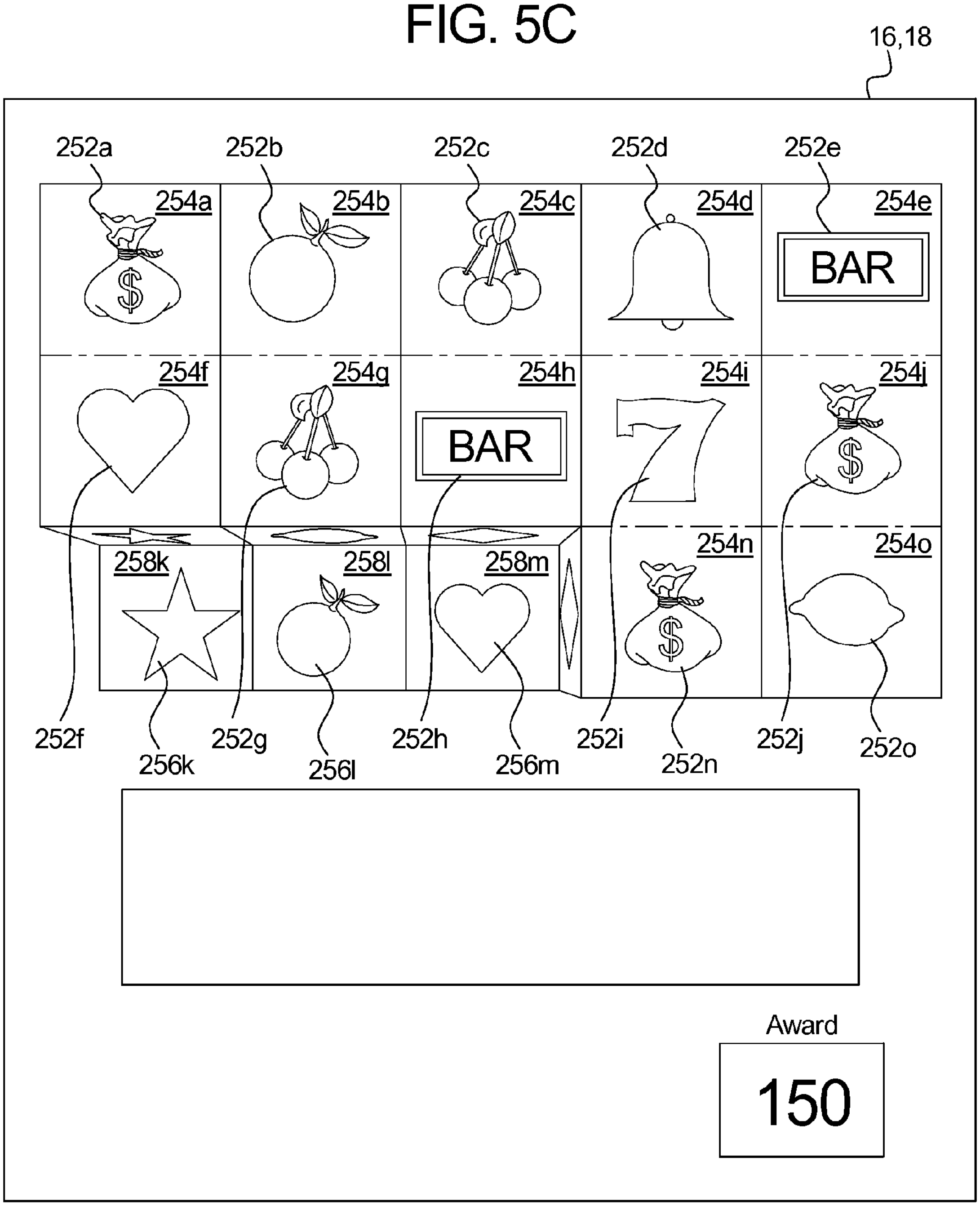

As seen in FIG. 5C, the gaming system then removes each of the multiple dimension symbols of the displayed winning symbol combination of star symbol-star symbol-star symbol. In this example, as seen in FIGS. 5B and 5C, the removal of the multiple dimension symbols 252*k*, 252*l* and 252*m* of the displayed winning symbol combination of star symbol-star symbol-star symbol from the bottom row of symbol display position grid 250*a* causes empty symbol display positions 254*k*, 254*l* and 254*m* in symbol display position grid 250*a*.

As illustrated in FIG. 5C, the created empty symbol display positions causes certain of the multiple dimension symbols 256*k*, 256*l* and 256*m* generated at symbol display positions 258*k*, 258*l* and 258*m* of the bottom or third row of symbol display position grid 250*b* to be displayed to the player. Thus, the creation of one or more empty symbol display positions in a front symbol display position grid (relative to the player's line of sight) causes one or more multiple dimension symbols at one or more corresponding symbol display positions of another symbol display position grid (which is, relative to the player's line of sight, behind the front symbol display position grid) to become displayed to the player.

As also illustrated in FIG. 5C, the created empty symbol display positions causes a plurality of the faces or sides of multiple dimension symbols 252*f*, 252*g*, 252*h* and 252*n* of symbol display position grid 250*a* to be displayed to the player. Thus, the creation of one or more empty symbol display positions in a symbol display position grid causes zero, one or more previously hidden faces or sides of one or more multiple dimension symbols at one or more corresponding symbol display positions in the same symbol display position grid to become displayed to the player.

Figure 5D:
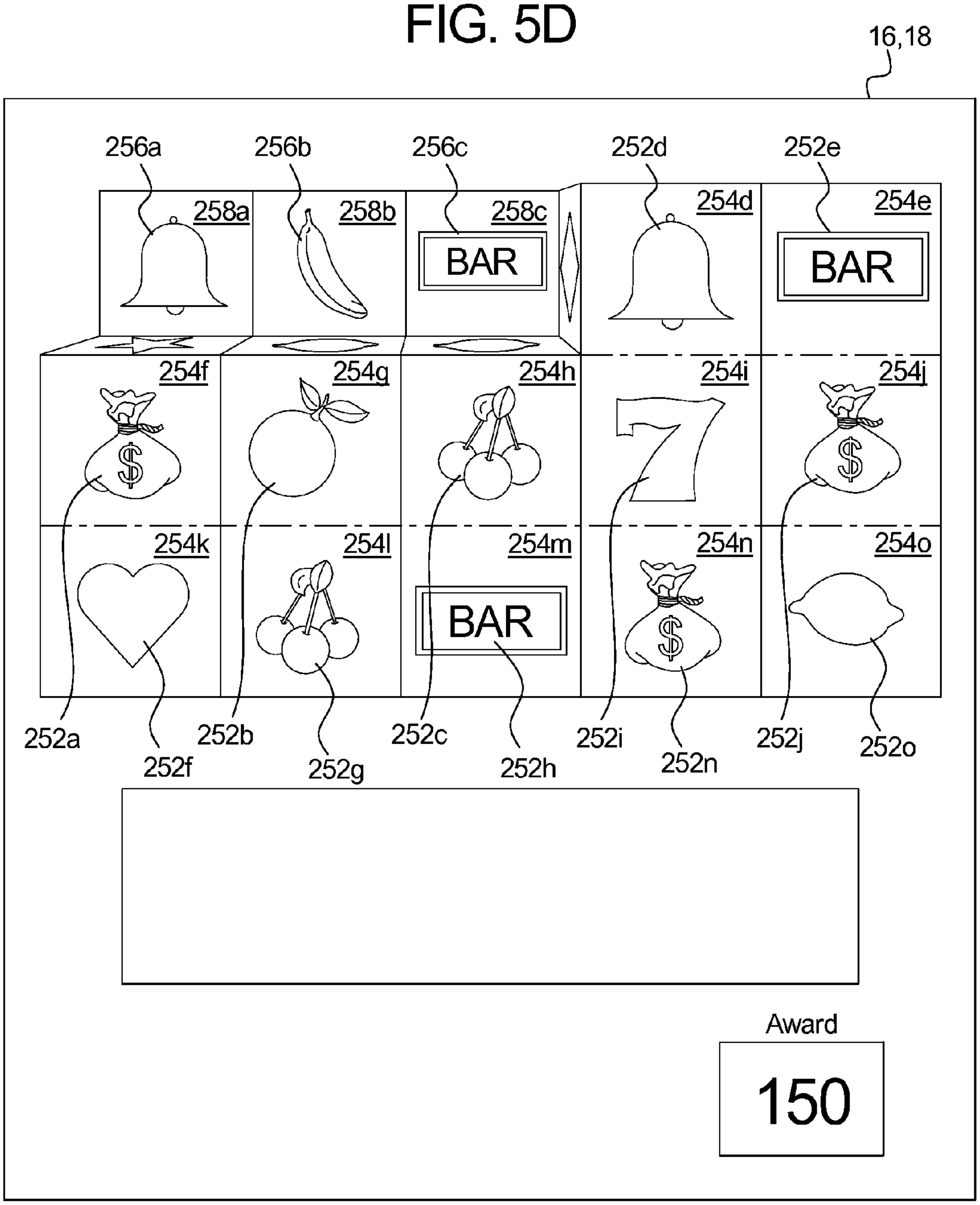

As seen in FIG. 5D, the revealing of certain of the multiple dimension symbols of the bottom row of symbol display position grid 250*b* and the revealing of certain sides of the multiple dimension symbols of symbol display position grid 250*a* is temporary because following the removal of the multiple dimension symbols 252*k*, 252*l* and 252*m* from the bottom row of symbol display position grid 250*a*, the gaming system shifts one or more multiple dimension symbols 252 from the symbol display position grid 250*a* downward to fill the empty symbol display positions 254 created from the removed symbols from this symbol display position grid. Thus, in the illustrated embodiment, to fill the created empty symbol display positions, the disclosed gaming system: (i) shifts multiple dimension symbols 252*f*, 252*g* and 252*h* from the middle row of symbol display position grid 250*a* downward into empty symbol display positions 254*k*, 254*l* and 254*m* of the bottom row of symbol display position grid 250*a*, and then (ii) shifts multiple dimension symbols 252*a*, 252*b* and 252*c* from the top row of symbol display position grid 250*a* downward into vacant symbol display positions 254*f*, 254*g* and 254*h* of the middle row of symbol display position grid 250*a*.

In this example, the shifting of the multiple dimension symbols from the top and middle row of symbol display position grid 250*a* downward into symbol display positions of the bottom row of symbol display position grid 250*a* causes different empty symbol display positions 254*a*, 254*b* and 254*c* in symbol display position grid 250*a* to be created. As seen in FIG. 5D, such different empty symbol display positions causes certain of the multiple dimension symbols 256*a*, 256*b* and 256*c* generated at symbol display positions 258*a*, 258*b* and 258*c* of symbol display position grid 250*b* to be displayed to the player. Moreover, such different empty symbol display positions also causes certain of the previously hidden faces or sides of certain of the multiple dimension symbols 252*a* (now in symbol display position 254*f*), 252*b* (now in symbol display position 254*g*), 252*c* (now in symbol display position 254*h*) and 252*d* of symbol display position grid 250*a* to be displayed to the player.

Figure 5E:
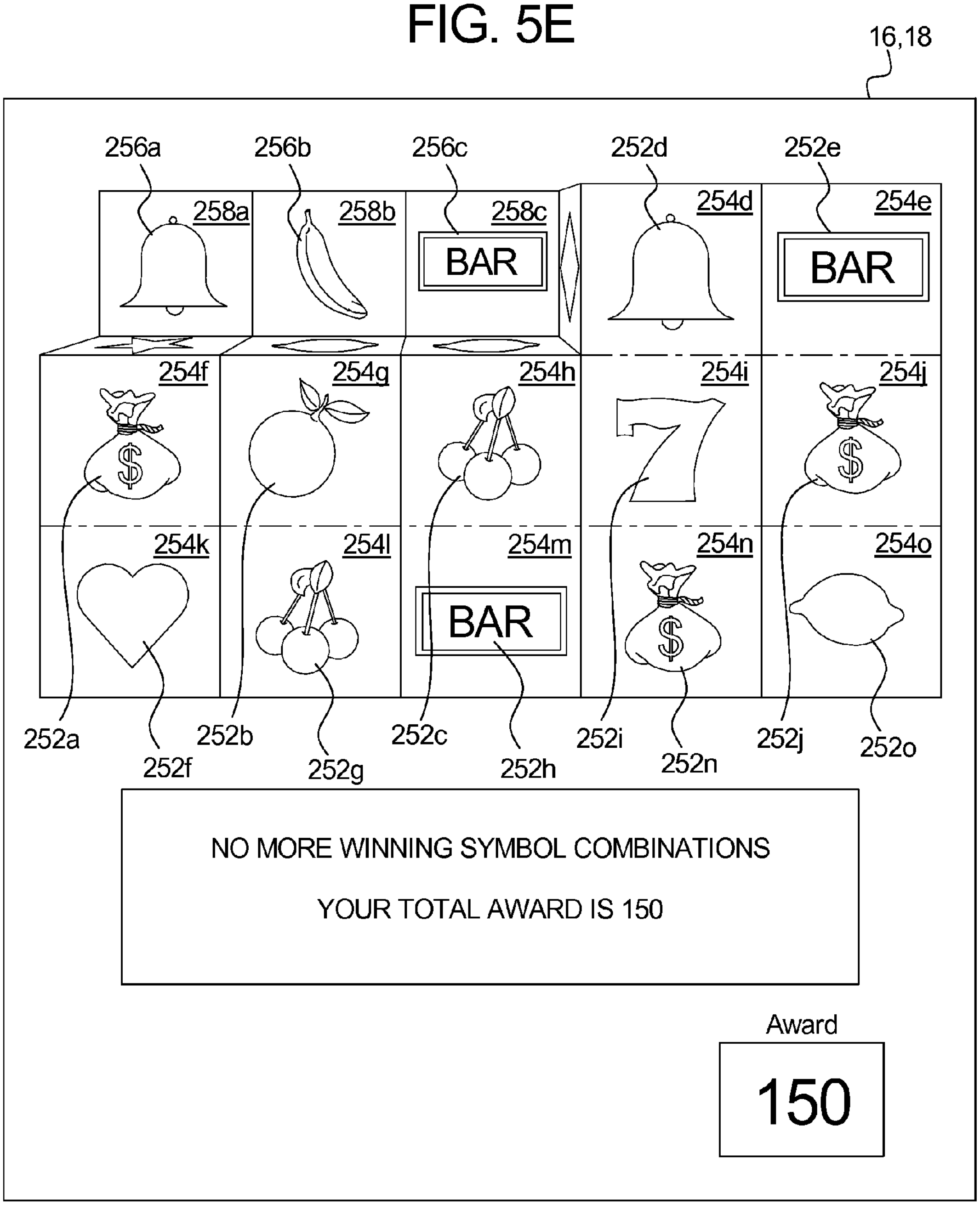

After removing one or more multiple dimension symbols from one of the symbol display position grids, shifting zero, one or more multiple dimension symbols within that symbol display position grid and revealing one or more multiple dimension symbols from both the same symbol display position grid and another one of the symbol display position grids, the gaming system evaluates the symbols currently displayed to the player to determine if any awards are associated with any currently displayed symbol combinations. Specifically, as seen in FIG. 5E, the gaming system evaluates each of the displayed sides or faces of the displayed multiple dimension symbols from symbol display position grid 250*a* and each of the displayed sides or faces of the displayed multiple dimension symbols from symbol display position grid 250*b*. In different embodiments, if a multiple dimension symbol includes a plurality of sides or faces currently displayed to the player, the gaming system evaluates one, more or each of the displayed sides in determining any awards to provide to the player. In this case, as seen in FIG. 5E, the gaming system determines no displayed sides or faces of the displayed multiple dimension symbols form any winning symbol combinations. Accordingly, the gaming system ends the play of the multi-dimensional cascading symbol game and provides appropriate messages such as "NO MORE WINNING SYMBOL COMBINATIONS" and "YOUR TOTAL AWARD IS 150" to the player visually, or through suitable audio or audiovisual displays.

In another embodiment employing multiple dimension symbols, for one play of the game, the gaming system evaluates the symbols exposed on a plurality of faces or sides of a plurality of multiple dimension symbols. In this embodiment, when a plurality of multiple dimension symbols are generated in the symbol display positions of each of the plurality of symbol display position grids, zero, one or more of the multiple dimension symbols from the plurality of symbol display position grids form a plurality of multiple dimension symbol display position planes or surfaces. These multiple dimension symbol display position planes or surfaces each include one or more symbol display positions from one or more of the symbol display position grids at one or more depths. In this embodiment, for each plane or surface of the multiple dimension symbol display position grid displayed to the player, the gaming system evaluates the symbols displayed on the faces of the multiple dimension symbols associated with that plane or surface. As described above, for each displayed plane or surface of the multiple dimension symbol display position grid, the gaming system removes any multiple dimension symbols from any winning symbol combinations, and shifts any multiple dimension symbols to reveal generated multiple dimension symbols in different symbol display position grids at the same depth or at different depths. This process is repeated until no winning symbol or winning symbol combination is displayed to the player.

Figure 6A:
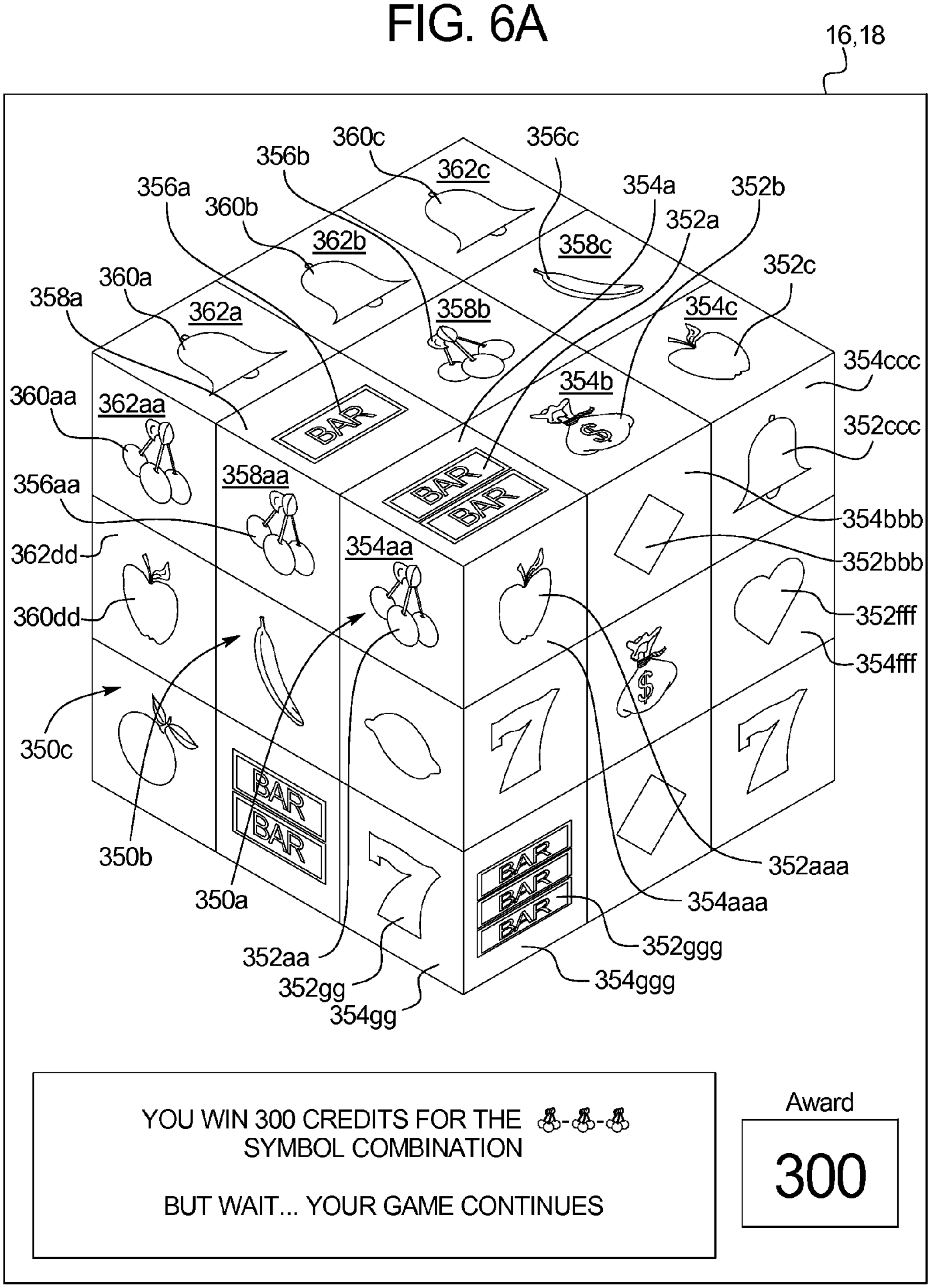
FIGS. 6A, 6B and 6C are isometric views of one embodiment of the gaming system disclosed herein illustrating the gaming system evaluating the symbols exposed on a plurality of faces or sides of a plurality of multiple dimension symbols.

For example, as seen in FIG. 6A, in one example embodiment of a play of the multi-dimensional cascading symbol game disclosed herein, the gaming system generates a plurality multiple dimension symbols at a plurality of symbol display positions of each of a plurality of symbol display position grids 350*a*, 350*b* and 350*c* of different depths. Specifically, the gaming system: (i) generates a plurality of multiple dimension symbols 352 at a plurality of symbol display positions 354 of symbol display position grid 350*a*, (ii) generates a plurality of multiple dimension symbols 356 at a plurality of symbol display positions 358 of symbol display position grid 350*b*, and (iii) generates a plurality of multiple dimension symbols 360 at a plurality of symbol display positions 362 of symbol display position grid 350*c*.

As seen in FIG. 6A, because symbol display position grids 350*b* and 350*c* are positioned behind symbol display position grid 350*a*, one or more sides of one or more of the multiple dimension symbols 356 and 360 generated at the plurality of symbol display positions 358 and 362 of symbol display position grids 350*b* and 350*c* are not initially displayed to the player. In this illustrated embodiment, the specific static view that this play of the game is displayed to the player causes a plurality of sides of a plurality of the multiple dimension symbols 352, 356 and 360 to be initially displayed to the player. For example, as seen in FIG. 6A, for one of the multiple dimension symbols, the gaming system displays: (i) the double-bar symbol 352*a* generated at symbol display position 354*a* on the displayed top side of this multiple dimension symbol, (ii) the cherry symbol 352*aa* generated at symbol display position 354*aa* on the displayed left side of this multiple dimension symbol, and (iii) the apple symbol 352*aaa* generated at symbol display position 354*aaa* on the displayed right side on this multiple dimension symbol. In another example, as also seen in FIG. 6A, for another one of the multiple dimension symbols, the gaming system displays: (i) the single bar symbol 356*a* generated at symbol display position 358*a* on the displayed top side of this multiple dimension symbol, and (ii) the cherry symbol 356*aa* generated at symbol display position 358*aa* on the displayed left side of this multiple dimension symbol. In another embodiment (not shown), the gaming system causes the plurality of symbol display position grids to rotate to enable the player to view each of the formed multiple dimension symbol display position planes for a single play of the game.

After generating a plurality of multiple dimension symbols, for each multiple dimension symbol display position plane or surface, the gaming system evaluates the symbols currently displayed to the player to determine if any awards are associated with any currently displayed symbol combinations. Specifically, as seen in FIG. 6A, the gaming system evaluates each of the displayed sides or faces of the displayed multiple dimension symbols which form the top multiple dimension symbol display position plane, the left multiple dimension symbol display position plane and the right multiple dimension symbol display position plane. In this example, starting with the left multiple dimension symbol display position plane, the gaming system determines that the displayed combination of cherry symbol-cherry symbol-cherry symbol of this left multiple dimension symbol display position plane is a winning symbol combination. It should be appreciated that this winning symbol combination includes one symbol displayed on one side of a multiple dimension symbol generated in symbol display position grid 350*a*, one symbol displayed on one side of a multiple dimension symbol generated in symbol display position grid 350*b* and one symbol displayed on one side of a multiple dimension symbol generated in symbol display position grid 350*c*. In this example, the gaming system provides an award of three-hundred credits to the player and provides appropriate messages such as "YOU WIN 300 CREDITS FOR THE CHERRY-CHERRY-CHERRY SYMBOL COMBINATION" and "BUT WAIT . . . YOUR GAME CONTINUES" to the player visually, or through suitable audio or audiovisual displays.

In one embodiment, the gaming system evaluates the displayed symbol sides of one or more multiple dimension symbols to determine if the displayed symbol sides form any designated patterns or any designated three dimensional patterns. For example, the gaming system evaluates the displayed symbol sides of one or more multiple dimension symbols to determine if any lines of three or more displayed symbol sides of one or more multiple dimension symbols are formed, any rectangles of four or more displayed symbol sides of two or more multiple dimension symbols are formed and/or any "L" shaped patterns of three or more displayed symbol sides of two or more multiple dimension symbols are formed. In this embodiment, such three-dimensional patterns may appear anywhere on one or more multiple dimension symbol display position planes (and not at a predetermined starting position and/or predetermined ending position). In one such embodiment, the gaming system displays the player any winning symbol combination in 3D.

Figure 6B:
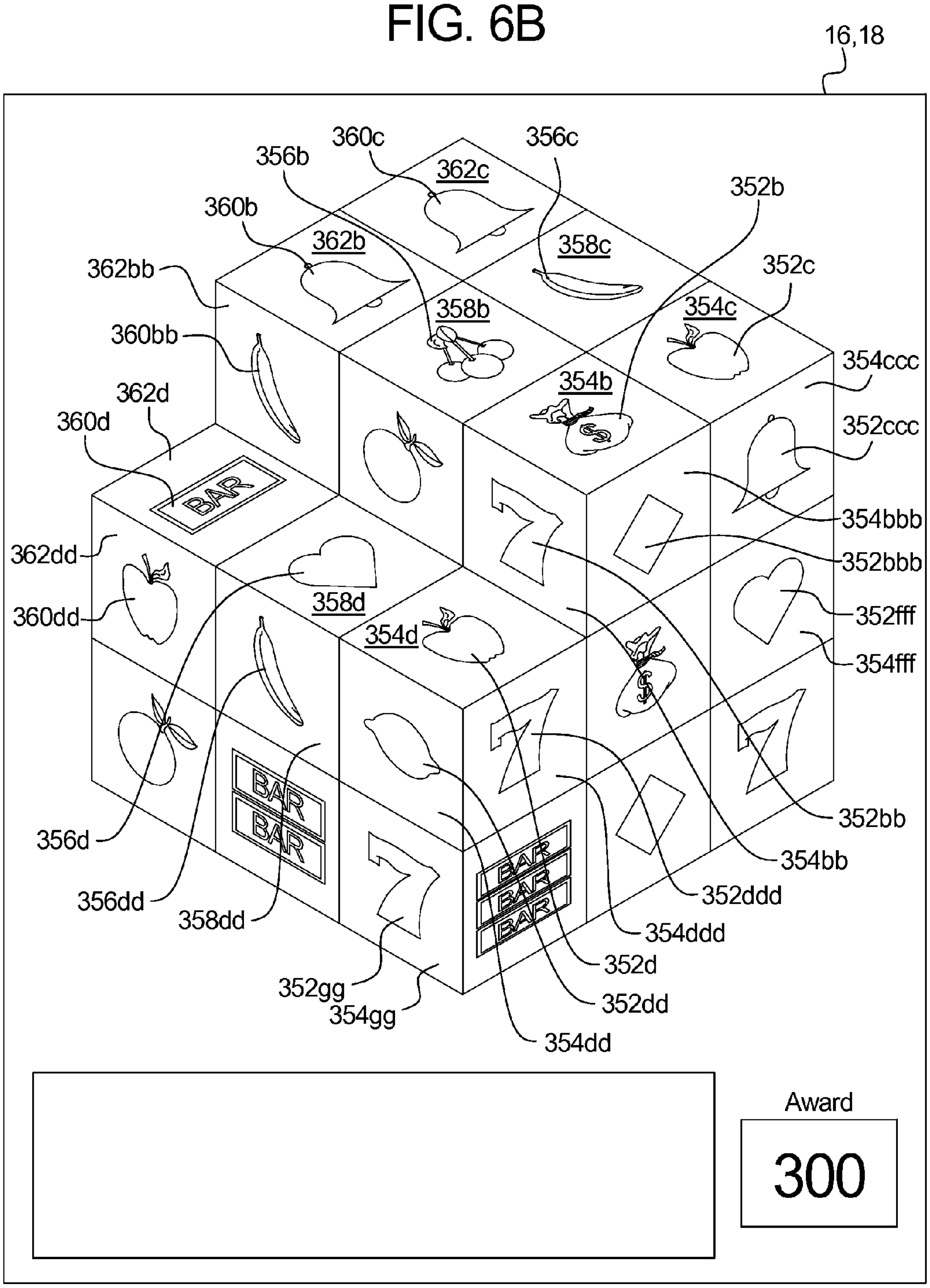

As seen in FIG. 6B, after determining any displayed winning symbol combination, the gaming system then removes each of the multiple dimension symbols of the displayed winning symbol combination of cherry symbol-cherry symbol-cherry symbol. In this example, as seen in FIG. 6B, the removal of these multiple dimension symbols from the left multiple dimension symbol display position plane causes an empty symbol display position in each of symbol display position grids 350*a*, 350*b* and 350*c* to be created. In this embodiment, the created empty symbol display positions causes a plurality of the faces or sides of a plurality of multiple dimension symbols to be displayed to the player. For example, the removal of the multiple dimension symbol with the cherry symbol 352*aa* causes both: (i) the apple symbol 352*d* of one side of the multiple dimension symbol generated at symbol display position 354*d* and (ii) the seven symbol 352*bb* of one side of the multiple dimension symbol generated at symbol display position 354*b*, to be displayed to the player. Thus, the creation of one or more empty symbol display positions in one or more symbol display position grids causes zero, one or more previously hidden faces or sides of one or more multiple dimension symbols at one or more corresponding symbol display positions in one or more symbol display position grids to become displayed to the player.

Figure 6C:
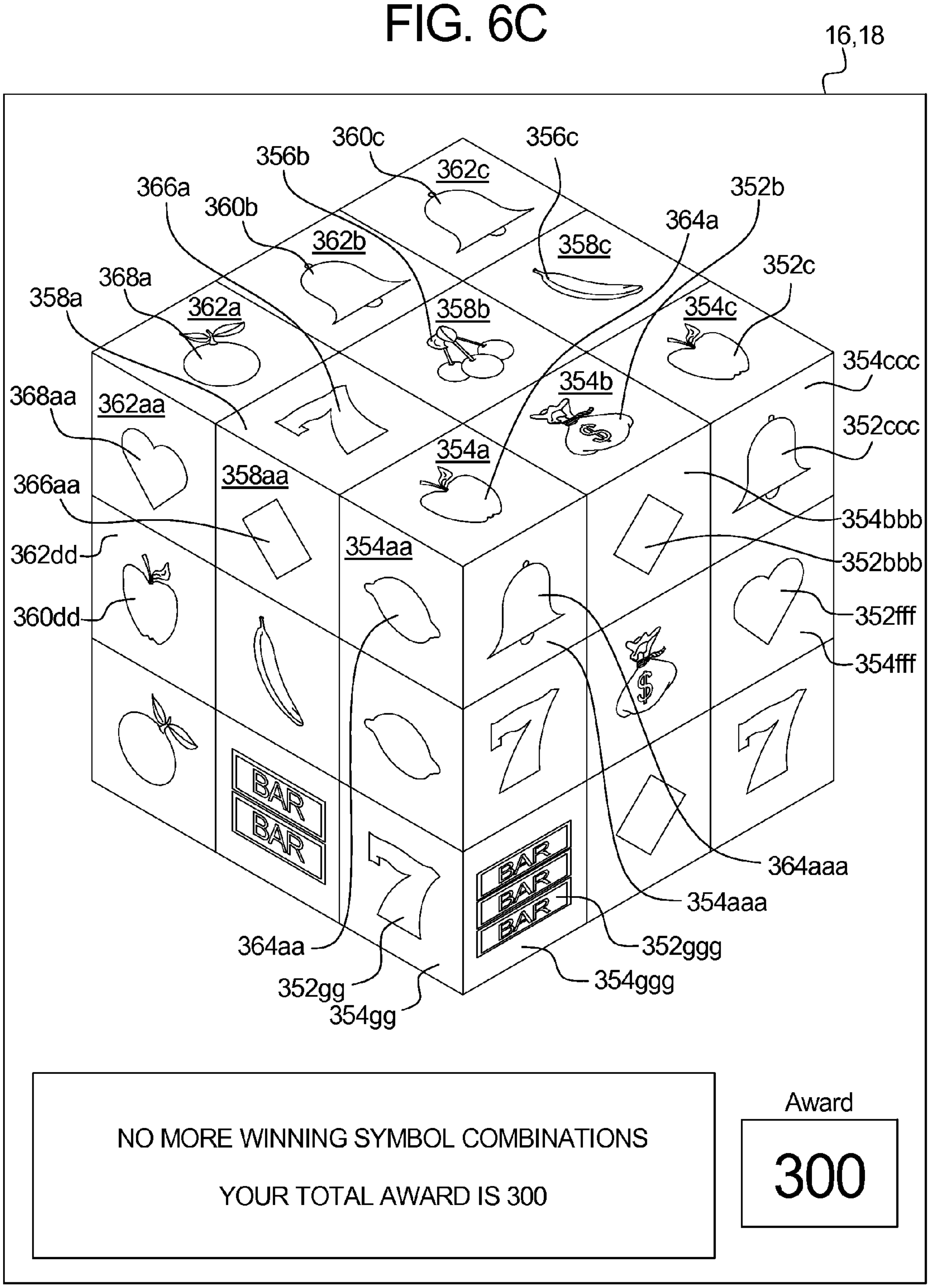

After removing any multiple dimension symbols which include any symbol sides which form part of any winning symbol combination, the gaming system determines that no multiple dimension symbols are positioned to be shifted to fill the created empty symbol display positions. Thus, as seen in FIG. 6C, the gaming system generates a new symbol for each empty symbol display position. Specifically, the gaming system generates: (A) one multiple dimension symbol which includes: (i) the apple symbol 364*a* generated at symbol display position 354*a* on the displayed top side of this multiple dimension symbol, (ii) the lemon symbol 364*aa* generated at symbol display position 354*aa* on the displayed left side of this multiple dimension symbol, and (iii) the bell symbol 364*aaa* generated at symbol display position 354*aaa* on the displayed right side on this multiple dimension symbol; (B) one multiple dimension symbol which includes: (i) the seven symbol 366*a* generated at symbol display position 358*a* on the displayed top side of this multiple dimension symbol, and (ii) the diamond symbol 366*aa* generated at symbol display position 358*aa* on the displayed left side of this multiple dimension symbol, and (C) one multiple dimension symbol which includes: (i) the orange symbol 368*a* generated at symbol display position 362*a* on the displayed top side of this multiple dimension symbol, and (ii) the heart symbol 368*aa* generated at symbol display position 362*aa* on the displayed left side of this multiple dimension symbol.

After such multiple dimension symbol generation, the gaming system again evaluates the symbols displayed on the left multiple dimension symbol display position plane. In this example, after determining that no winning symbol combinations are formed from the symbol sides displayed on the left multiple dimension symbol display position plane, the gaming system proceeds to any remaining unevaluated multiple dimension symbol display position planes to determine if any winning symbol combinations are formed.

As seen in FIG. 6C, in this example, after determining that the left multiple dimension symbol display position plane includes no winning symbol combinations, the gaming system proceeds to evaluate the right multiple dimension symbol display position plane. After determining that the right multiple dimension symbol display position plane includes no winning symbol combinations, the gaming system proceeds to evaluate the top multiple dimension symbol display position plane. After determining that the top multiple dimension symbol display position plane includes no winning symbol combinations, the gaming system determines that no multiple dimension symbol display position planes remain unevaluated and ends the play of the game. Accordingly, as seen in FIG. 6C, the gaming system provides appropriate messages such as "NO MORE WINNING SYMBOL COMBINATIONS" and "YOUR TOTAL AWARD IS 300" to the player visually, or through suitable audio or audiovisual displays.

In one embodiment, as described above, the gaming system evaluates the symbol sides of a multiple dimension symbol display position plane, removes any multiple dimension symbols with any symbol sides included in a winning symbol combination, shifts and/or generates one or more additional multiple dimension symbols and reevaluates the symbol sides of this multiple dimension symbol display position plane before proceeding to the next multiple dimension symbol display position plane. In this embodiment, the removal of one or more multiple dimension symbols associated with one multiple dimension symbol display position plane may affect the symbols displayed in another multiple dimension symbol display position plane. In one such embodiment, the removal of one or more multiple dimension symbols associated with one multiple dimension symbol display position plane may cause a non-winning symbol combination to be replaced with a winning symbol combination. In another such embodiment, the removal of one or more multiple dimension symbols associated with one multiple dimension symbol display position plane may cause a winning symbol combination to be replaced with a non-winning symbol combination. For example, as seen in FIGS. 6A to 6C, the removal of the cherry symbol-cherry symbol-cherry symbol winning symbol combination of the left multiple dimension symbol display position plane also caused a removal of the bell symbol 360*a* generated in symbol display position 362*a*. In this example, the removal of this bell symbol caused the previously displayed bell symbol-bell symbol-bell symbol winning combination to be replaced with the currently displayed non-winning orange symbol-bell symbol-bell symbol winning combination.

In another embodiment, the gaming system evaluates the symbol sides of the multiple dimension symbols which form a multiple dimension symbol display position plane, and proceeds to the next multiple dimension symbol display position plane before removing any symbols from any winning symbol combination. For example, if this embodiment were implemented with the multiple dimension symbols generated in FIG. 6A, the gaming system would provide the player the award associated with the cherry symbol-cherry symbol-cherry symbol winning symbol combination of the left multiple dimension symbol display position plane and then, before removing any of these symbols, provide the player the award associated with the bell symbol-bell symbol-bell symbol winning combination of the top multiple dimension symbol display position plane.

In one embodiment wherein the gaming system evaluates the symbol sides of the multiple dimension symbols which form a multiple dimension symbol display position plane, and proceeds to the next multiple dimension symbol display position plane before removing any symbols from any winning symbol combinations, the gaming system provides the player an additional award, such as triggering a bonus game, if one or more multiple dimension symbols each include a plurality of symbol sides included in a plurality of winning symbol combinations. For example, a multiple dimension symbol includes a King on one face which is part of a three King winning symbol combination and also includes a Queen on another face which is part of a three Queen winning symbol combination. In this example, the gaming system provides the player an additional award, such as a multiplier of the awards associated with the three King winning symbol combination and the three Queen winning symbol combination because this multiple dimension symbol is associated with a plurality of winning symbol combinations. In an alternative embodiment, if a multiple dimension symbol is associated with a plurality of winning symbol combinations, the gaming system causes each of the symbol sides of that multiple dimension symbol to become wild symbols.

In another embodiment, rather than generating one or more multiple dimension symbols for any created empty symbol display positions, the gaming system continues removing multiple dimension symbols from any winning symbol combination until one or more holes or craters are created in the set of symbol display position grids. In one such embodiment, the gaming system provides the player an additional award if an entire level of multiple dimension symbols are removed and/or if enough multiple dimension symbols are removed to enable the player to view through each symbol display position grid.

In one another embodiment, one or more designated characters, such as one or more "fairies" are associated with one or more symbol display positions. In this embodiment, if the multiple dimension symbol generated at that associated symbol display position is removed, the designated character associated with that symbol display position is activated to provide one or more additional awards to the player. For example, if a designated character is activated, the gaming system turns certain multiple dimension symbols into wild symbols, modifies the award associated with certain winning symbol combinations, removes one or more multiple dimension symbols (which could activate other designated characters), awards a bonus round, provides one or more bonus symbols needed to trigger a bonus round, and/or provides the player with a cash award. In different embodiments, each designated character is associated with the same additional award or associated with different additional awards. In another embodiment, each successive designated character that is activated during a play of a game is associated with a successively higher valued award (i.e., the first activated character for a play of the a game is associated with a 2× multiplier and the second activated character for the play of the game is associated with a 3× multiplier).

In another embodiment, a plurality, but not all, of the sides of each multiple dimension symbol includes a symbol. In this embodiment, the removal of one or more multiple dimension symbols causes the symbols of one or more sides of one or more other multiple dimension symbols to be displayed to the player to create one or more additional paylines. That is, one or more paylines are not initially evaluated for a play of a game (because no symbols are displayed along those paylines), but as one or more symbols are removed from one or more symbol display position grids, different symbols are displayed along those paylines and thus evaluated. In another embodiment, each side of a multiple dimension symbol includes the same symbol.

In another embodiment, each symbol of the plurality of symbols (or alternatively, one or more sides or faces of each of the plurality of multiple dimension symbols) is associated with a characteristic, such as a color or shape. In this embodiment, the gaming system displays the symbols of the plurality of symbol display position grids to the player such that the characteristic (e.g., the color) associated with one or more symbols (or one or more sides of one or more multiple dimension symbols) are displayed to the player (even if the entire symbol or the symbols on such faces are not displayed to the player). That is, the gaming system displays one or more characteristics of one or more symbols (or one or more sides of one or more multiple dimension symbols) while not displaying the entire symbols (or not displaying the symbols of the sides of those multiple dimension symbols).

In one such embodiment employing characteristics, the gaming system utilizes the characteristics of the symbols to convey information to the player. For example, a designated characteristic, such as the color gold, is associated with wild symbols, wherein the gaming system displays to the player that each of the symbols of a symbol display position grid are gold and therefore, the symbols of this symbol display grid are wild symbols. In this example, the player plays the game in an attempt to clear away enough symbols to reach that symbol display position grid of wild symbols.

In another such embodiment employing characteristics, the gaming system utilizes the characteristics of the symbols to provide to the player one or more awards, such as one or more matching characteristic awards. In this embodiment, different characteristics are associated with different awards, such that the award provided to the player is based on which characteristic is matched. For example, if a plurality of the displayed symbols (or a plurality of displayed symbol sides of a plurality of the multiple dimension symbols) generated at a plurality of the symbol display positions of one or more of the symbol display position grids are each associated with the same characteristic, such as the same color silver, the gaming system provides to the player the matching characteristic award associated with that characteristic.

In another embodiment, the multi-dimensional tumbling reels game disclosed herein utilizes the fourth dimension of time to determine any awards to be provided to a player. In one such embodiment, the gaming system associates certain symbols with a duration or quantity which those symbols remain in one of the symbol display grids. In this embodiment, if such symbols are generated in the symbol display positions of the symbol display position grids and such symbols form part of a winning symbol combination, then as long as the associated duration or quantity has not expired, such symbols are not removed from the symbol display positions of the symbol display position grids.

Figure 7:
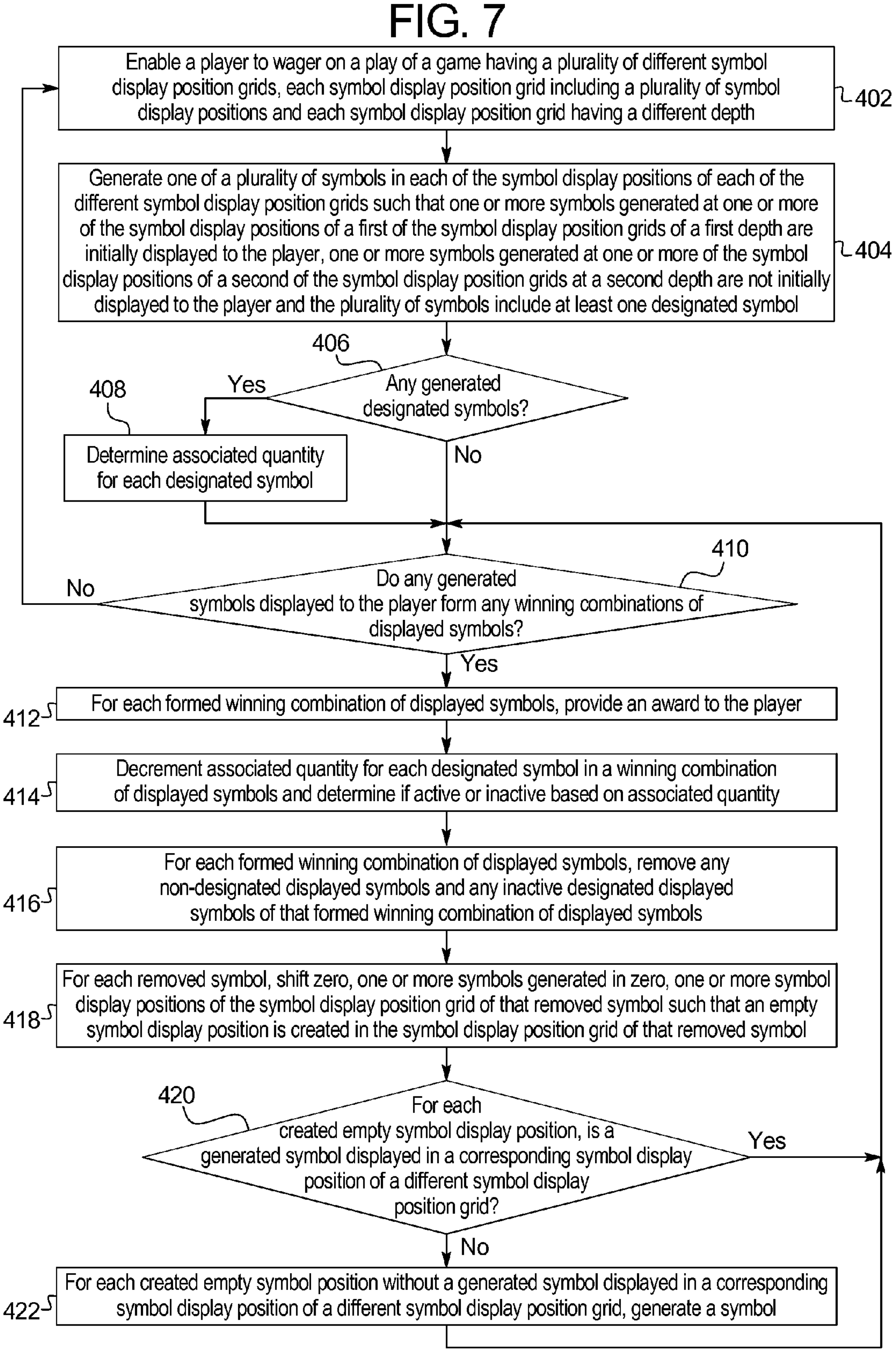
FIG. 7 is a flow chart another example process for operating a gaming system providing the multi-dimensional cascading symbol game disclosed herein.

Specifically, FIG. 7 illustrates a flowchart of an example embodiment of a process for operating a gaming system or a gaming device utilizing the fourth dimension of time. In one embodiment, this process is embodied in one or more software programs stored in one or more memories and executed by one or more processors or servers. Although this process is described with reference to the flowchart illustrated in FIG. 7, it should be appreciated that many other methods of performing the acts associated with this process may be used. For example, the order of certain steps described may be changed, or certain steps described may be optional.

In one embodiment, the disclosed gaming system enables a player to wager on a play of a game having a plurality of different symbol display position grids as indicated in block 402. As described above, each symbol display position grid includes a plurality of symbol display positions having a depth and arranged in a plurality of rows and a plurality of columns.

The gaming system generates one of a plurality of symbols at each of the symbol display positions of each of the different symbol display position grids as indicated in block 404. In this embodiment, the plurality of symbols include at least one designated symbol. In one such embodiment, the designated symbol is associated with a duration of time. In another such embodiment, the designated symbol is associated with a quantity of winning symbol combinations. In another such embodiment, the designated symbol is associated with a quantity of symbol shifts. In another such embodiment, the designated symbol is associated with a quantity of games played.

In these embodiments, as described above, the generation of the symbols at the symbol display positions of the symbol display position grids results in one or more symbols generated at one or more of the symbol display positions of a first of the symbol display position grids of a first depth being initially displayed to the player and one or more symbols generated at one or more of the symbol display positions of a second of the symbol display position grids at a second depth are not initially displayed to the player. Put differently, since at least a second one of the symbol display position grids is at least partially positioned behind the first one of the symbol display position grids (relative to the player's line of sight), at least one of the symbols generated at at least one of the symbol display positions of the second one of the symbol display position grids is masked by at least one symbol generated at at least one of the symbol display positions of another symbol display position grid and thus not initially displayed to the player.

In one embodiment, upon generating one of the plurality of symbols at each symbol display position, the gaming system determines whether one or more designated symbols are generated as indicated by block 406. If at least one designated symbol is generated, the gaming system determines an indicated quantity for the at least one generated designated symbol, as indicated by block 308. In one such embodiment, each generated designated symbol is associated with an indicated quantity, indicated as a numeral in parentheses next to the designated symbol. In another embodiment, the gaming system displays the indicated quantity associated with a designated symbol by color of the designated symbol (i.e., the designated symbol fades from black to white as the indicated quantity decreases). In another embodiment, the gaming system displays an indicated quantity on a separate counter associated with each designated symbol.

After determining a quantity for zero, one or more generated symbols, the gaming system determines whether any of the generated symbols displayed to the player form any winning combinations of displayed symbols as indicated in diamond 410 of FIG. 7. As described above, because certain generated symbols are not initially displayed to the player (i.e., certain generated symbols are blocked from being displayed by other symbols generated at different depths), the gaming system only evaluates the symbols currently displayed to the player for award evaluation purposes.

In one embodiment, the gaming system analyzes each of any displayed designated symbols as a Wild symbol, such that each generated designated symbol increases the likelihood of generating a winning symbol combination. In another embodiment, the gaming system analyzes each of any displayed designated symbols as a high value symbol, such that each generated designated symbol increases the award amount associated with one or more winning symbol combinations.

If no winning combination of displayed symbols is formed, the gaming system ends the play of the game and returns to block 302 to enable the player to place another wager on another play of the multi-dimensional cascading symbols game. On the other hand, if any winning combination of displayed symbols are formed, for each formed winning combination of displayed symbols, the gaming system provides to the player an award associated with that displayed winning symbol combination as indicated by block 412.

After providing the player any awards, the gaming system decrements the indicated quantity associated with each of any designated symbols in a winning combination of displayed symbols as indicated by block 414. In one embodiment, for each of any generated and displayed designated symbols, the gaming system determines whether that designated symbol is active or inactive based on the decremented indicated quantity associated with the designated symbol. In one example embodiment, the gaming system determines that a generated designated symbol is inactive if the indicated quantity associated with the designated symbol is equal to or less than a predefined quantity, such as zero.

After decrementing the indicated quantity associated with zero, one or more generated and displayed designated symbols, for each formed winning combination of displayed symbols, the gaming system removes any non-designated displayed symbols and any inactive designated displayed symbols of that formed winning combination of displayed symbols as indicated in block 416. Removing such symbols results in one or more empty symbol display positions which the gaming system may fill by shifting one or more other displayed symbols. Specifically, as indicated in block 318, for each removed symbol, the gaming system shifts zero, one or more symbols generated in zero, one or more symbol display positions of the symbol display position grid of that removed symbol. Such shifting results in, for each removed symbol, an empty symbol display position being created in the symbol display position grid of that removed symbol.

After exposing zero, one or more previously hidden symbols, as indicated in diamond 418, for each created empty symbol display position, the gaming system determines whether a generated symbol is displayed in a corresponding symbol display position of a different symbol display position grid. The gaming system thus determines whether each created empty symbol display position reveals another symbol generated at another depth.

If any least one created empty symbol display position does not reveal another symbol generated at another depth, as indicated in block 420, the gaming system generates a symbol for each created empty symbol display position without a generated symbol displayed in a corresponding symbol display position of a different symbol display position grid. The gaming system then returns to diamond 410 and again determines if any of the generated symbols currently displayed to the player form any winning combinations of displayed symbols. On the other hand, if each created empty symbol display position reveals another symbol of another symbol display position of another symbol display position grid of a different depth, the gaming system returns to diamond 410 and again determines if any of the generated symbols currently displayed to the player form any winning combinations of displayed symbols. Accordingly, this embodiment of the gaming system provides an element of the fourth dimension of time by providing a player with an opportunity to win multiple awards for multiple generations of symbols, wherein one or more generated designated symbols is usable for a plurality of generations and thus potentially usable in a plurality of winning symbol combinations. Moreover, since such designated symbols remain displayed for a number of symbol generations, the designated symbols are more likely to accumulate in the lower symbol display positions of the symbol display position grids resulting in winning symbol combinations being more likely to be generated as the game progresses.

In another embodiment, the gaming system tracks a quantity of times a designated symbol is included in one or more winning symbol combinations. In this embodiment, if the quantity of times the designated symbol is included in one or more winning symbol combinations reaches a designated quantity, an additional award is provided to the player. For example, if a designated symbol was previously included in four separate winning symbol combinations (for a single play of a game) and that designated symbol is included in a fifth winning symbol combination (for the single play of the game), the gaming system triggers a bonus round in association with this designated symbol. In one such example, the gaming system displays this designated symbol as a balloon symbol which inflates more each time the designated symbol is included in a winning symbol combination.

In another embodiment utilizing the fourth dimension of time to determine any awards to be provided to a player, the gaming system records or stores one or more of the symbols generated in one or more of symbol display positions of one or more of the symbol display position grids for one or more plays of the game. In one such embodiment, the gaming system records or stores, for an individual gaming device, the symbols generated in the symbol display positions of the symbol display position grids for each play of the game. In another such embodiment, the gaming system records or stores, for a group of gaming devices, the symbols generated in the symbol display positions of the symbol display position grids for each play of the game. In another such embodiment, the gaming system records or stores, for an individual player, the symbols generated in the symbol display positions of the symbol display position grids for each play of the game. In another such embodiment, the gaming system records or stores, for a group of players, the symbols generated in the symbol display positions of the symbol display position grids for each play of the game.

In one embodiment, when a player initiates a play of this tumbling reels game, the gaming system randomly picks a designated quantity of one or more previous plays of the game and uses the previously recorded symbols of those plays of the game to determine any awards for the initiated play of the game. In another embodiment, when a player initiates a play of this tumbling reels game, the gaming system picks a designated quantity of one or more previous plays of the game from a designated period of time and uses the previously recorded symbols of those plays of the game to determine any awards for the initiated play of the game.

In this embodiment, for a play of a game, in addition to or as an alternative to evaluating the displayed symbols generated at the symbol display positions of one or more symbol display position grids, the gaming system evaluates the displayed symbols generated at the symbol display positions of one or more symbol display position grids compared to the stored symbols generated in the symbol display positions of the symbol display position grids for one or more previous plays of the game. That is, in this embodiment, a player would be playing against symbols generated for one or more players who previously played the tumbling reels game. In one such embodiment, the gaming system determines an award based on how many displayed symbols generated at the symbol display positions of one or more symbol display position grids were also displayed at the symbol display positions of one or more symbol display position grids for one or more previous plays of the game. In another such embodiment, the gaming system determines an award based on which symbols were generated and displayed in both the current play of the game and one or more previous plays of the game. In another such embodiment, the gaming system determines an award based on which symbols were generated and displayed in which symbol display positions of which symbol display position grids in both the current play of the game and one or more previous plays of the game. In another such embodiment, the gaming system determines an award based on which symbols were generated and displayed in a current play of the game compared to the outcome that another player (or other players) previously generated in one or more previous or concurrent plays of the game.

In one embodiment, the gaming system enables the player to win an additional award depending on how the symbols generated for that player compare to the symbols generated for a subsequent play of the game. For example, the gaming system provides the player an award if the symbols generated for that player compare favorable with the symbols generated for another play of the game. That is, this embodiment of the gaming system provides that the symbols generated for a player are utilized in at least two games, once as an active symbols for the current play of the game and once as an inactive or comparison symbols for one or more subsequent plays of the game.

In another embodiment, when the gaming system is initially started, the gaming system does not have the available data of stored symbols from previous plays of the game (because no symbols have been generated in any plays of the game yet). In this embodiment, one or more default bots are used to build an applicable database of symbols generated in plays of the game. As the database becomes more extensive with stored symbols from actual plays of the game, the gaming system relies more on the previous plays of the game and less on the default bots.

In another embodiment, the gaming system determines an award based on which symbols were generated and displayed in a current play of the game compared to a target outcome, such as a predefined target image formed by the plurality of symbols. In another embodiment, the gaming system determines an award based on a plurality of players each contributing one or more symbols to match a target outcome. In one such embodiment, each multiple dimension symbol display position plane is associated with a different target characteristic, such as a different color, and a plurality of players each contribute one or more multiple dimension symbols in an attempt to cause each multiple dimension symbol display position plane to have its associated target characteristic. In one such embodiment, if a multiple dimension symbol display position plane achieves its target characteristic, such as each of the sides of each of the multiple dimension symbols which form the multiple dimension symbol display position plane are the same color, the gaming system provides an award to any players that contributed one or more multiple dimension symbols. In another such embodiment, if a multiple dimension symbol display position plane achieves its target characteristic, such as each of the sides of each of the multiple dimension symbols which form the multiple dimension symbol display position plane are the same color, the gaming system enables each of the players that contributed one or more multiple dimension symbols to participate in a bonus game.

In another embodiment, the gaming system utilizes an accumulator cube to provide one or more awards over a period of time. In one such embodiment, if a symbol from a player's play of a game matches a target symbol in an exact position in a target accumulator cube, the gaming system adds that symbol to an accumulator cube. In this embodiment, when the accumulator cube is filled with symbols (either all from an individual player over a plurality of plays of the game or from a group of a plurality of players over a plurality of plays of the game), the gaming system provides an award to one or more players, such as providing each player an award value or enabling each player to participate in a bonus game.

In one embodiment, the symbols available to be generated in association with each of the symbol display position grids are the same. In this embodiment, each of the symbols generated at each of the symbol display positions of each of the symbol display position grids are selected from the same plurality of symbols. For example, for a 3×5 reel game, the gaming system utilizes the same reel strips to create ten or more symbol display position grids. In this example, the gaming system then randomly layers the created symbol display position grids. As winning combinations are removed from one layer (i.e., one symbol display position grid), the symbols from the next layer (i.e., the next symbol display position grid) become displayed to fill the created empty symbol display positions.

In another embodiment, different symbols are available to be generated in association with different symbol display position grids. In this embodiment, a plurality of the symbols available to be generated in a plurality the symbol display positions of at least one of the symbol display position grids are selected from one plurality of symbols and a plurality of the symbols available to be generated in a plurality of the symbol display positions of at least a different one of the symbol display position grids are selected from a different plurality of symbols. For example, the plurality of symbols available to be generated in association with the symbol display positions of one symbol display position grid at one depth includes a higher concentration of wild symbols and/or high valued symbols. In another example, the plurality of symbols available to be generated in association with the symbol display positions of a second symbol display position grid at a second depth includes a higher concentration of symbols associated with the triggering of a bonus game.

In another embodiment, the symbols available to be generated with each symbol display position grid vary between plays of the game. For example, for a first play of the game, the plurality of symbols available to be generated in association with the symbol display positions of a third symbol display position grid at a third depth include a higher concentration of wild symbols, while for a second play of the game, the plurality of symbols available to be generated in association with the symbol display positions of a second symbol display position grid at a second depth include a higher concentration of wild symbols. In another example, for a first play of the game, the plurality of symbols available to be generated in association with the symbol display positions of a third symbol display position grid at a third depth include a higher concentration of bonus triggering symbols, while for a second play of the game, the plurality of symbols available to be generated in association with the symbol display positions of a first symbol display position grid at a first depth include a higher concentration of wild symbols.

In another embodiment of employing different symbols in association with different symbol display position grids, the gaming system layers the symbol display position grids with symbols in order of payback percentage. For example, the top layer (i.e., the first symbol display position grid including generated symbols initially displayed to the player) may be created from reel strips having an 85% average expected payback percentage, the next layer (i.e., the second symbol display position grid including generated symbols not initially displayed to the player) may be created from reel strips having a 110% average expected payback percentage, the next layer (i.e., the third symbol display position grid including generated symbols not initially displayed to the player) may be created from reel strips having a 250% average expected payback percentage, and the next layer (i.e., the fourth symbol display position grid including generated symbols not initially displayed to the player) may be created from reel strips having a 1000% average expected payback percentage. In this example, the more winning combinations a player removes from the top layer, the more likely the player is to experience the higher valued awards associated with the later or deeper layers.

In another embodiment of employing different symbols in association with different symbol display position grids, the gaming system creates ten or more layers (i.e., ten or more symbol display position grids) from reel strips of various average expected payback percentages. For example, the average expected payback percentage of the reel strips is 95%, but one or more average expected payback percentages of one or more reel strips are higher than 100%. In this example, the gaming system randomly arranges the reel strips with the created symbol display position grids such that the player could receive any of the reel strips in association with any of the symbol display position grids. Accordingly, based on which reel strip is randomly associated with which symbol display position grid (and thus based on which symbols are likely to be generated in symbol display positions initially displayed to the player) the play of the game may be associated with a greater than 100% average expected payback percentage or associated with an average expected payback percentage of less than 100%. In different embodiments, the varying average expected payback percentages of various symbol display position grids is accomplished through using one or more wild symbols, one or more multiplier wild symbols, one or more top award symbols, one or more progressive jackpot symbols, one or more bonus symbols, and/or one or more split symbols.

In another embodiment, the gaming system employs one or more symbol stacks, such as stacked wild symbols. In one such embodiment, a generated symbol stack is associated with a plurality of symbol display positions at a plurality of symbol display positions grids of different depths. For example, if a stacked wild symbol is generated at a first symbol display position of a first symbol display position grid of a first depth, if one of the wild symbols of that stack wild symbol is subsequently removed, the gaming system will reveal another one of the wild symbols of that stacked wild symbol at the first symbol display position of a second symbol display position grid of a second depth.

In one such embodiment, the different symbols of a stacked symbol are associated with different awards and/or features. For example, a stacked wild symbol generated at a first symbol display position of a first symbol display position grid of a first depth is associated with a multiplier of 1×, a stacked wild symbol generated at a first symbol display position of a second symbol display position grid of a second depth (which is, relative to the player's line of sight, behind the first symbol display position of the first symbol display position grid) is associated with a multiplier of 2×, and a stacked wild symbol generated at a first symbol display position of a third symbol display position grid of a third depth (which is, relative to the player's line of sight, behind the first symbol display position of the first symbol display position grid and also behind the second symbol display position of the second symbol display position grid) is associated with a multiplier of 3×.

In another embodiment, the gaming system provides the player a bonus award if each of the symbols generated at each of the symbol display positions of a symbol display position grid are removed. In another embodiment, the rows or columns on one or more symbol display position grids at one or more different depths include random or pre-defined sets of symbols. For example, the symbols on the top row of the symbol display position grid at a second depth level all contain the same symbol, and the gaming system provides a bonus award to the player if the entire row of symbol display positions of that symbol display position grid are revealed.

In another embodiment, the gaming system adds additional symbol display position grids of different depths as the game progresses. In this embodiment, if at least one symbol is removed from at least one symbol display position of the last or deepest symbol display position grid (relative to the player's line of sight), the gaming system adds an additional symbol display position grid behind that symbol display position grid (i.e., a new deepest symbol display position grid).

In another embodiment, the size and/or configuration of the symbol display position grids at one or more different depths are different. For example, a first symbol display position grid of a first depth includes three rows and five columns of symbol display positions and a second symbol display position grid of a second depth includes four rows and five columns of symbol display positions. In another embodiment, the number of symbol display positions of a plurality of symbol display position grids of different depths are different. For example, a first symbol display position grid of a first depth includes a first number of one or more symbol display positions and a second symbol display position grid of a second depth includes a second number of one or more symbol display positions. In another example, one symbol display position grid of a first depth includes a plurality of symbol display positions and another symbol display position grid of a second depth includes one symbol display position.

In another embodiment, one or more symbols are not initially generated at one or more symbol display position grids (i.e., one or more symbol display position grids include one or more initially empty symbol display positions). In this embodiment, when a first symbol display position grid including at least one initially empty symbol display position is placed in front of (relative to the player's line of sight) a second symbol display position grid, symbols from the second symbol display position grid automatically fill in or are otherwise displayed through the empty symbol display positions. Accordingly, the gaming system provides a player access to symbols from deeper symbol display position grids due to such initially empty symbol display positions. It should be appreciated that in these embodiments, one or more symbols generated in a plurality of different symbol display position grids at different depths will be initially displayed to the player.

In another embodiment, the gaming system utilizes a plurality of different sets of symbol display position grids of different depths. In one such embodiment, at least a first area, column or row of a first set of symbol display position grids is associated with or linked to at least a first area, column or row of a second set of symbol display position grids and at least a second area, column or row of the first set of symbol display position grids is not associated with or linked to any area, column or row in any second set of symbol display position grids. In a play of the game, as described above, symbols are independently generated for each set of symbol display position grids and the symbols displayed for each set of symbol display position grids of different depths are independently evaluated to provide any awards for any winning symbols or winning symbol combinations. After the evaluation, the gaming system removes zero, one, or more symbols to leave zero, one, or more empty symbol display positions. In one embodiment, if any empty symbol display positions are formed on the first area, column or row of the first set of symbol display position grids, the gaming system shifts or transfers one or more symbols from the first area, column or row of the first set of symbol display position grids to the linked first area, column or row of the second set of symbol display position grids to occupy the one or more empty symbol display positions. In this embodiment, if there are any empty symbol display positions on the second area, column or row of the first set of symbol display position grids, the gaming system does not shift or transfer any symbols from the second area, column or row of the first set of symbol display position grids to the second area, column or row of the second set of symbol display position grids. The gaming system then independently evaluates the symbols displayed for each set of symbol display position grids to provide any awards for any winning symbols or winning symbol combinations.

In one alternative embodiment, rather than shifting one or more symbols from the first set of symbol display position grids to the second set of symbol display position grids, the gaming system transfers any winning symbols which are removed from the first set of symbol display position grids to the second set of symbol display position grids. In this embodiment, the second set of symbol display position grids is filled with symbols over a quantity of plays of the game (by one or more players). In one such embodiment, if any of the symbols transferred to the second set of symbol display position grids form any winning symbol combinations, the gaming system provides any awards associated with such winning symbol combinations to the player or players that contributed such symbols.

In another embodiment, the gaming system employs a symbol accumulation sequence and a symbol evaluation sequence. The symbol accumulation sequence includes an accumulation of a plurality of symbols in association with a persistence game. The symbol accumulation sequence also includes the maintenance of a persistence game arrangement that displays a designated quantity of accumulated symbols. In one such embodiment, the accumulated symbols are the symbols removed from any winning symbol combination as described above. Such maintenance of the persistence game arrangement includes, in certain instances, removing at least one previously accumulated symbol from the persistence game arrangement to enable the gaming system to cause the persistence game arrangement to accumulate and display a newly generated symbol. The symbol evaluation sequence includes an evaluation of at least some of the previously accumulated symbols to determine an award. In one embodiment, the symbol evaluation sequence includes the gaming system determining and providing an award based on the accumulated symbols of the persistence game. In another embodiment, the symbol evaluation sequence includes the gaming system determining and providing an award based on at least one of the accumulated symbols of the persistence game and at least one displayed symbol for a current play of the tumbling reels game disclosed herein.

In another embodiment, after removing one or more symbols from any displayed winning symbol combinations, the gaming system determines if a designated event has occurred. In this embodiment, if the gaming system determines that a designated event has occurred, the gaming system generates at least one predetermined designated symbol in at least one of the empty symbol display positions created by the removal of symbols from the winning symbol combinations. For example, the gaming device generates a predetermined designated wild symbol in one or more of the empty symbol display positions. In one embodiment, any predetermined designated symbols are independent of and in addition to the plurality of symbols. That is, the predetermined designated symbols are separate from and not initially available with the plurality of symbols for the gaming system to generate in the plurality of symbol display positions. In this embodiment, the gaming system evaluates the displayed symbols (including any generated predetermined designated symbols) and provides any awards associated with any winning symbol combinations.

In one alternative embodiment, once a single symbol has been exposed in a symbol display position grid, the gaming system also reveals any symbols at that depth that are not obscured by symbols in front of them. In another embodiment, once an entire symbol display position grid has been removed, the gaming system also revealed the symbols generated in the symbol display positions of the next symbol display position grid of a different shape (than the removed grid).

In another alternative embodiment, rather than shifting any of the symbols into any empty symbol display positions, the gaming system disclosed herein retains one or more symbols in its respective symbol display position. In this embodiment, as described above, any symbols generated at any symbol display positions of any symbol display position grid of a different depth (than the depth of the symbol display position grid with at least one empty symbol display position) are displayed and evaluated with the remaining displayed symbols.

In another embodiment, the gaming system removes any symbols of any displayed winning symbol combinations, evaluates the symbols currently displayed to the player (i.e., evaluates symbols generated in symbol display positions of at least two different symbol display position grids of different depths), removes any symbols of any displayed winning symbol combinations and repeats this process until no more displayed winning symbol combinations exist. In this embodiment, when no more displayed winning symbol combinations exist, the gaming system shifts zero, one or more symbols as described above and then repeats removing symbols and evaluating any currently displayed symbols to determine if any winning symbol combinations are displayed.

In another embodiment, the shifting of symbols into empty symbol display positions can occur in any suitable direction (e.g., up, down, left, right, diagonal) in one symbol display position grid and/or in any suitable direction (e.g., backwards, forward) between different symbol display positions of different depths. In one such embodiment, if an empty symbol display position is created in one of the symbol display position grids, one or more symbols generated in one or more symbol display positions of one or more different symbol display position grids (of one or more different depths) are shifted to fill the empty symbol display position.

In another embodiment, if one or more empty symbol display positions are created in one or more symbol display position grids, the gaming system generates and displays a symbol for each created empty symbol display position. In one such embodiment, when certain symbols of certain winning symbol combinations are removed to create one or more empty symbol display positions, the gaming system generates and displays a symbol for each created empty symbol display position. In this embodiment, when certain other symbols of certain other winning symbol combinations are removed to create one or more empty symbol display positions, the gaming system proceeds as described above with revealing one or more symbols generated at one or more symbol display positions of one or more different symbol display position grids of different depths. In another such embodiment, the gaming system enables the player to pick which created empty symbol display positions will be filled by the gaming system generating and displaying a symbol for that created empty symbol display position and which created empty symbol display positions will be filled by the gaming system revealing one or more symbols generated at one or more symbol display positions of one or more different symbol display position grids of different depths.

It should be appreciated that in different embodiments, one or more of:

i. a quantity of symbol display position grids;
ii. a quantity of symbol display positions in each symbol display position grid;
iii. a shape or configuration of each symbol display position grid;
iv. a quantity of rows in each symbol display position grid;
v. a quantity of columns in each symbol display position grid;
vi. which displayed symbols are evaluated to determine any awards;
vii. which displayed sides or faces of which multiple dimension symbols are evaluated to determine any awards;
viii. which symbols are shifted;
ix. which symbol retain their original positioning;

x. which symbols are removed from which symbol display position grids;

xi. a quantity of symbols removed from any symbol display position grids;

xii. the direction of any shifting of any symbols;

xiii. which symbols are available to be generated in each symbol display position grid;

xiv. an order of evaluating the plurality of multiple dimension symbol display position planes;

xv. a duration of time a designated symbol will remain at one of the symbol display positions of one of the symbol display position grids;

xvi. a quantity of winning symbols combinations which a designated symbol will remain at one of the symbol display positions of one of the symbol display position grids;

xvii. a quantity of symbol shifts a designated symbol will remain at one of the symbol display positions of one of the symbol display position grids;

xviii. a quantity of games played a designated symbol will remain at one of the symbol display positions of one of the symbol display position grids;

xix. a quantity of designated symbols generated;

xx. which symbols are associated with which characteristics;

xxi. which sides of which multiple dimension symbols are associated with which characteristics;

xxii. a quantity of stored symbols utilized to compare the generated symbols from a current play of the game to determine any awards for the player;

xxiii. which stored symbols from which previous plays of the game are utilized to compare the generated symbols from the current play of the game to determine any awards for the player;

xxiv. any determination disclosed herein;

is/are predetermined, randomly determined, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, causes the at least one processor to operate with the at least one input device and the at least one display device to:

(a) generate one of a plurality of different symbols at each of a plurality of symbol display positions of each of a plurality of symbol display position grids, wherein:

(i) each symbol display position grid is associated with a different depth, (ii) the plurality of symbol display positions of each of the symbol display position grids form at least three columns and at least three rows including a first row, a second row positioned adjacent to the first row and a third row positioned adjacent to the second row, and (iii) a plurality of the symbol display positions of a first one of the symbol display position grids associated with a first depth correspond to a plurality of the symbol display positions of a second one of the symbol display position grids associated with a second, different depth;

(b) display a plurality of the generated symbols, wherein:

(i) a plurality of the symbols generated at a plurality of the symbol display positions of at least one of the symbol display position grids are initially displayed, and (ii) a plurality of the symbols generated at a plurality of the symbol display positions of at least one of the symbol display position grids are not initially displayed;

(c) determine if any of the displayed symbols form any winning symbol combinations; and (d) if a plurality of the displayed symbols form at least one winning symbol combination:

(i) display an award for each displayed winning symbol combination, (ii) remove at least one displayed symbol from at least one displayed winning symbol combination, (iii) for each of any symbols removed from the first row of the symbol display positions of any of the symbol display position grids, reposition at least one of the displayed symbols to another one of the symbol display positions of the symbol display position grid of the removed symbol to create at least one empty symbol display position of the symbol display position grid of the removed symbol, (iv) for each of any symbols removed from the second row of the symbol display positions of any of the symbol display position grids, reposition at least one of the displayed symbols to another one of the symbol display positions of the symbol display position grid of the removed symbol to create at least one empty symbol display position of the symbol display position grid of the removed symbol, (v) for each created empty symbol display position, display one of the symbols generated at one of the symbol display positions of one of the symbol display position grids different than the symbol display position grid of the removed symbol, wherein said symbol is generated at one of the symbol display positions corresponding to the symbol display position of the removed symbol, and (vi) repeat (c) to (d) at least once.

2. The gaming system of claim 1, wherein at least two of the symbol display position grids each include a different quantity of symbol display positions.

3. The gaming system of claim 1, wherein when executed by the at least one processor, the plurality of instructions cause the at least one processor to: (i) generate the plurality of symbols at each of the plurality of symbol display positions of the first one of the symbol display position grids from a first plurality of symbols, and (ii) generate the plurality of symbols at each of the plurality of symbol display positions of the second one of the symbol display position grids from a second, different plurality of symbols.

4. The gaming system of claim 1, wherein when executed by the at least one processor, the plurality of instructions cause the at least one processor to generate one of the plurality of symbols for at least one of the created empty symbol display positions if no symbols remain at any symbol display positions corresponding to the at least one created empty symbol display position.

5. The gaming system of claim 1, wherein when executed by the at least one processor, the plurality of instructions cause the at least one processor to remove a plurality of displayed symbols from each displayed winning symbol combination.

6. The gaming system of claim 1, wherein each of the symbols generated at each of the symbol display positions of at least one of the symbol display position grids are not initially displayed.

7. The gaming system of claim 1, wherein at least one of the symbols generated at at least one of the symbol display positions of at least one of the symbol display position grids is associated with a characteristic.

8. The gaming system of claim 7, wherein when executed by the at least one processor, the plurality of instructions cause the at least one processor to display a matching characteristic award if a plurality of the displayed symbols generated at a plurality of the symbol display positions of at least one of the symbol display position grids are each associated with the same characteristic.

9. The gaming system of claim 1, wherein at least one of the symbols is a stacked wild symbol associated with a wild symbol generated in a plurality of corresponding symbol display positions of a plurality of symbol display position grids of different depths.

10. A method of providing a cascading symbol game, said method comprising:

(a) causing at least one processor to execute a plurality of instructions to generate one of a plurality of different symbols at each of a plurality of symbol display positions of each of a plurality of symbol display position grids, wherein:
  (i) each symbol display position grid is associated with a different depth,
  (ii) the plurality of symbol display positions of each of the symbol display position grids form at least three columns and at least three rows including a first row, a second row positioned adjacent to the first row and a third row positioned adjacent to the second row, and
  (iii) a plurality of the symbol display positions of a first one of the symbol display position grids associated with a first depth correspond to a plurality of the symbol display positions of a second one of the symbol display position grids associated with a second, different depth;
(b) causing at least one display device to display a plurality of the generated symbols, wherein:
  (i) a plurality of the symbols generated at a plurality of the symbol display positions of at least one of the symbol display position grids are initially displayed, and
  (ii) a plurality of the symbols generated at a plurality of the symbol display positions of at least one of the symbol display position grids are not initially displayed;
(c) causing the at least one processor to execute the plurality of instructions to determine if any of the displayed symbols form any winning symbol combinations; and
(d) if a plurality of the displayed symbols form at least one winning symbol combination:
  (i) causing the at least one display device to display an award for each displayed winning symbol combination,
  (ii) causing the at least one processor to execute the plurality of instructions to remove at least one displayed symbol from at least one displayed winning symbol combination,
  (iii) for each of any symbols removed from the first row of the symbol display positions of any of the symbol display position grids, causing the at least one processor to execute the plurality of instructions to reposition at least one of the displayed symbols to another one of the symbol display positions of the symbol display position grid of the removed symbol to create at least one empty symbol display position of the symbol display position grid of the removed symbol,
  (iv) for each of any symbols removed from the second row of the symbol display positions of any of the symbol display position grids, causing the at least one processor to execute the plurality of instructions to reposition at least one of the displayed symbols to another one of the symbol display positions of the symbol display position grid of the removed symbol to create at least one empty symbol display position of the symbol display position grid of the removed symbol,
  (v) for each created empty symbol display position, causing the at least one display device to display one of the symbols generated at one of the symbol display positions of one of the symbol display position grids different than the symbol display position grid of the removed symbol, wherein said symbol is generated at one of the symbol display positions corresponding to the symbol display position of the removed symbol, and
  (vi) repeating (c) to (d) at least once.

11. The method of claim 10, wherein at least two of the symbol display position grids each include a different quantity of symbol display positions.

12. The method of claim 10, which includes: (i) causing the at least one processor to execute the plurality of instructions to generate the plurality of symbols at each of the plurality of symbol display positions of the first one of the symbol display position grids from a first plurality of symbols, and (ii) causing the at least one processor to execute the plurality of instructions to generate the plurality of symbols at each of the plurality of symbol display positions of the second one of the symbol display position grids from a second, different plurality of symbols.

13. The method of claim 10, which includes causing the at least one processor to execute the plurality of instructions to generate one of the plurality of symbols for at least one of the created empty symbol display positions if no symbols remain at any symbol display positions corresponding to the at least one created empty symbol display position.

14. The method of claim 10, which includes causing the at least one processor to execute the plurality of instructions to remove a plurality of displayed symbols from each displayed winning symbol combination.

15. The method of claim 10, wherein each of the symbols generated at each of the symbol display positions of at least one of the symbol display position grids are not initially displayed.

16. The method of claim 10, wherein at least one of the symbols generated at at least one of the symbol display positions of at least one of the symbol display position grids is associated with a characteristic.

17. The method of claim 16, which includes displaying a matching characteristic award if a plurality of the displayed symbols generated at a plurality of the symbol display positions of at least one of the symbol display position grids are each associated with the same characteristic.

18. The method of claim 10, wherein at least one of the symbols is a stacked wild symbol associated with a wild symbol generated in a plurality of corresponding symbol display positions of a plurality of symbol display position grids of different depths.

19. The method of claim 10, which is provided through a data network.

20. The method of claim 19, wherein the data network is the internet.

* * * * *

UNITED STATES PATENT AND TRADEMARK OFFICE

CERTIFICATE OF CORRECTION

PATENT NO. : 8,366,538 B1
APPLICATION NO. : 13/187648
DATED : February 5, 2013
INVENTOR(S) : Brian F. Saunders et al.

It is certified that error appears in the above-identified patent and that said Letters Patent is hereby corrected as shown below:

IN THE CLAIMS

In Claim 1, Column 45, Line 65, replace "causes" with --cause--.
In Claim 8, Column 47, Line 31, replace "the same" with --a same--.
In Claim 17, Column 49, Line 13, replace "the same" with --a same--.
In Claim 20, Column 50, Line 10, replace "the" with --an--.

Signed and Sealed this
Twenty-third Day of April, 2013

Teresa Stanek Rea
*Acting Director of the United States Patent and Trademark Office*